(12) United States Patent
Kohno et al.

(10) Patent No.: US 8,479,059 B2
(45) Date of Patent: Jul. 2, 2013

(54) RADIO COMMUNICATION DEVICE, RADIO COMMUNICATION SYSTEM, PROGRAM AND RADIO COMMUNICATION METHOD

(75) Inventors: Michinari Kohno, Tokyo (JP); Kenji Yamane, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 417 days.

(21) Appl. No.: 12/741,536

(22) PCT Filed: Oct. 2, 2008

(86) PCT No.: PCT/JP2008/067880
§ 371 (c)(1),
(2), (4) Date: May 5, 2010

(87) PCT Pub. No.: WO2009/063704
PCT Pub. Date: May 22, 2009

(65) Prior Publication Data
US 2010/0257421 A1  Oct. 7, 2010

(30) Foreign Application Priority Data
Nov. 15, 2007 (JP) .................. 2007-297154
Mar. 17, 2008 (JP) .................. 2008-068226

(51) Int. Cl.
*G01R 31/28* (2006.01)
(52) U.S. Cl.
USPC ........... 714/712; 714/748; 714/749; 714/774; 714/701; 714/704; 714/746; 714/799; 455/522; 370/318; 370/333; 356/4.07; 367/118; 367/121; 367/128

(58) Field of Classification Search
None
See application file for complete search history.

(56) References Cited

U.S. PATENT DOCUMENTS

| 5,729,557 A | * | 3/1998 | Gardner et al. | ............ 714/774 |
| 6,087,961 A | | 7/2000 | Markow | |
| 6,594,494 B1 | * | 7/2003 | Kakehi | ............ 455/437 |

(Continued)

FOREIGN PATENT DOCUMENTS

| EP | 1489432 A1 | 12/2004 |
| EP | 1811426 A2 | 7/2007 |

(Continued)

OTHER PUBLICATIONS

International Search Report dated Nov. 11, 2008, in PCT/JP2008/067880.

(Continued)

*Primary Examiner* — John Trimmings
(74) *Attorney, Agent, or Firm* — Finnegan, Henderson, Farabow, Garrett & Dunner, L.L.P.

(57) ABSTRACT

Provided is a radio communication device for performing radio communication with another radio communication device includes a control unit that controls to prepare for data loss during radio communication of transmission data and a transmission unit that transmits the transmission data by radio according to the control of the control unit. One of the radio communication device and the other radio communication device estimates a distance from the other based on a field intensity of a radio signal which is judged to satisfy a certain requirement regarding noise component among received radio signals received from the other of the radio communication device and the other radio communication device. The control unit performs a control of a content according to the distance estimation result.

18 Claims, 23 Drawing Sheets

U.S. PATENT DOCUMENTS

| | | | |
|---|---|---|---|
| 7,155,655 B2* | 12/2006 | Cheng | 714/748 |
| 7,349,707 B2* | 3/2008 | Shinmei | 455/456.1 |
| 7,668,556 B2* | 2/2010 | Yokoshi et al. | 455/456.3 |
| 7,949,066 B2* | 5/2011 | Zehavi | 375/295 |
| 8,085,865 B2* | 12/2011 | Zehavi | 375/295 |
| 2004/0214565 A1 | 10/2004 | Shinmei | |
| 2005/0209921 A1 | 9/2005 | Roberts et al. | |
| 2005/0228613 A1 | 10/2005 | Fullerton et al. | |
| 2006/0267841 A1 | 11/2006 | Lee et al. | |
| 2007/0010200 A1* | 1/2007 | Kaneko | 455/41.2 |
| 2007/0060170 A1* | 3/2007 | Fukui | 455/456.1 |
| 2007/0097900 A1* | 5/2007 | Kim et al. | 370/318 |
| 2007/0124625 A1* | 5/2007 | Hassan et al. | 714/704 |
| 2007/0178837 A1* | 8/2007 | Koike | 455/41.2 |
| 2011/0312368 A1* | 12/2011 | Hamdi et al. | 455/522 |

FOREIGN PATENT DOCUMENTS

| | | |
|---|---|---|
| JP | 2005-167471 | 7/1993 |
| JP | 2002-300545 | 10/2002 |
| JP | 2002-300548 | 10/2002 |
| JP | 2002-325211 | 11/2002 |
| JP | 2004-032394 | 1/2004 |
| JP | 2004-328542 | 11/2004 |
| JP | 2005-301428 | 10/2005 |
| JP | 2005-301804 | 10/2005 |
| JP | 2006-081036 | 3/2006 |
| JP | 2006-253765 | 9/2006 |
| JP | 2006-300918 | 11/2006 |
| JP | 2006-528459 | 12/2006 |
| JP | 2007-071816 | 3/2007 |
| JP | 2007-89090 | 4/2007 |
| JP | 2007-142944 | 6/2007 |
| JP | 2007-189726 | 7/2007 |
| KR | 10-2008-0069337 | 7/2008 |

OTHER PUBLICATIONS

Supplementary European Search Report issued in European Application No. 08792400, dated Jul. 5, 2012.

Supplementary European Search Report issued in European Application No. 08850127.5, dated Jul. 17, 2012.

Supplementary European Search Report issued in European Application No. 08850303.2, dated Jul. 20, 2012.

Japanese Office Action issued in corresponding Japanese Application No. JP 2008-068226 dated Oct. 2, 2012.

Yamada et al., Indoor Area Estimation Based on Propagation Loss Characteristics of Wireless LAN, Institute of Electronics, Information and Communication Engineers, pp. 181-184.

Extended European Search Report in European Patent Application No. 08849521.3 dated Sep. 6, 2012.

* cited by examiner

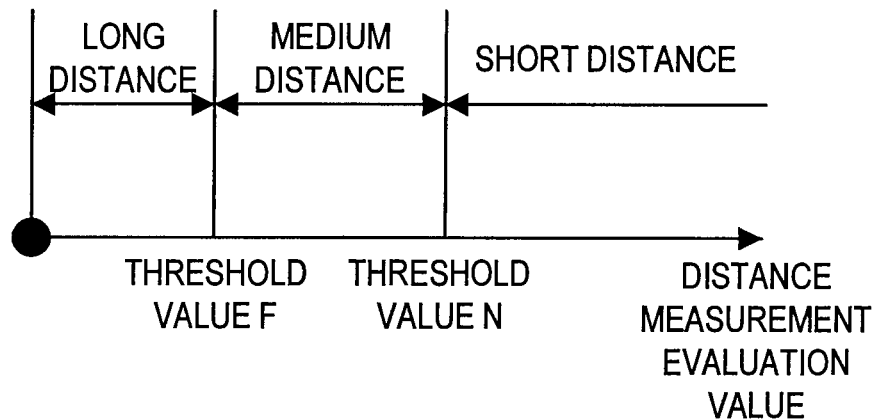

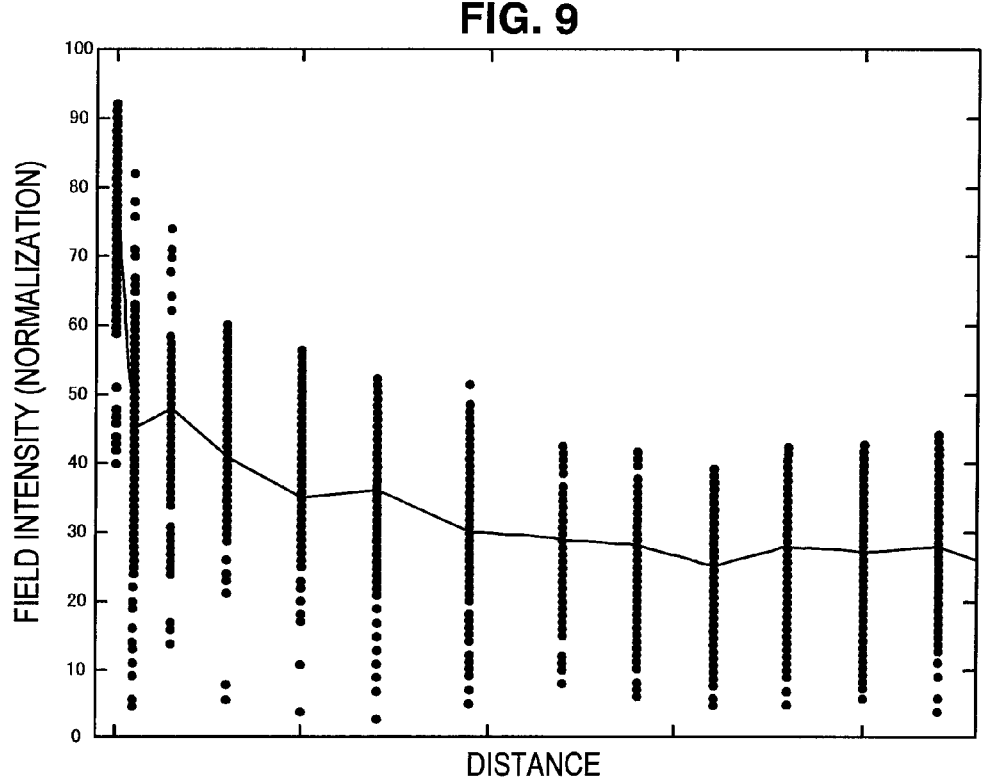
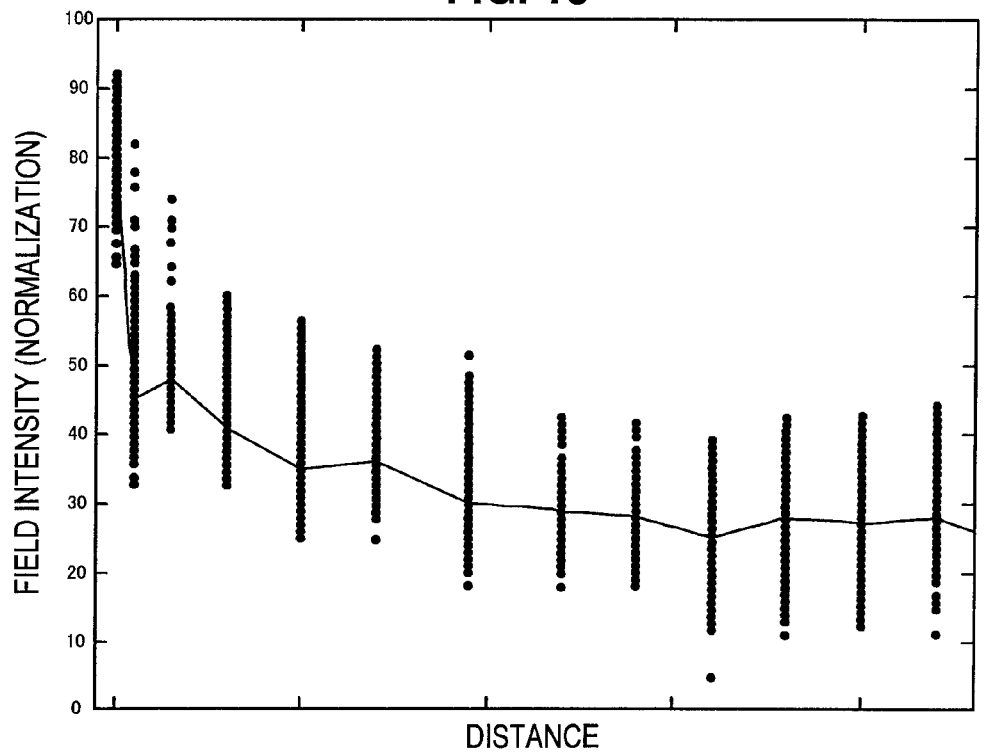

RADIO COMMUNICATION DEVICE, RADIO COMMUNICATION SYSTEM, PROGRAM AND RADIO COMMUNICATION METHOD

TECHNICAL FIELD

The present invention relates to a radio communication device, a radio communication system, a program and a radio communication method.

BACKGROUND ART

Recently, portable radio communication devices including a radio communication function have been widely used. The radio communication device can perform radio communication with other radio communication devices by directly transmitting/receiving radio signals to/from another radio communication device, for example. Radio communication by such radio communication device sometimes is referred to as an ad-hoc mode in comparison with an infrastructure mode which requires a base station.

Further, when a radio communication device on transmitting side transmits a packet (data) to a radio communication device on receiving side by radio, the packet is sometimes lost and the other radio communication device cannot receive the packet properly. In order to solve the issue due to a packet loss, Qos (Quality Of Service) such as an FEC (Forward Error Correction), an ARQ (Automatic Repeat Request) and the like have been proposed.

The FEC is a technology for recovering a lost packet by redundant coding. The radio communication device on transmitting side generates a redundant packet (parity packet) based on a transmission packet and adds the redundant packet to the transmission packet, so the radio communication device on receiving side can recover the lost packet by decoding the transmission packet using the redundant packet.

Further, the ARQ is a technology for recovering a lost packet in which the lost packet detected in the radio communication device on receiving side is informed to the radio communication device on transmitting side and the radio communication device on the transmitting side retransmits the lost packet. The Qos including FEC, ARQ and the like are described in Patent Literature 1, for example.

Citation List

Patent Literature

Patent Literature 1: Japanese Patent Application National Publication No. 2006-528459

SUMMARY OF INVENTION

Technical Problem

However, when the content of the Qos such as FEC and ARQ is fixed, the communication efficiency may be deteriorated due to communication path conditions. For example, redundant packets are excessively added when a communication path is in a condition in which packet loss hardly occurs, communication resources are unnecessarily consumed. On the other hand, when a communication path is in a condition in which the number of packets are lost, the amount of redundant packets are not enough and the lost packets cannot be recovered properly.

The present invention is made in view of the above-mentioned issue, and aims to provide a radio communication device, a radio communication system, a program and a radio communication method, which are new and improved and are capable of dynamically changing a content of a control to prepare for data loss according to communication path conditions.

Solution to Problem

According to the first aspect of the present invention in order to achieve the above-mentioned object, there is provided a radio communication device that performs radio communication with another radio communication device, including a control unit that controls to prepare for data loss during radio communication of transmission data; and a transmission unit that transmits the transmission data by radio to the other radio communication device according to the control of the control unit. Further, one of the radio communication device and the other radio communication device estimates a distance from the other based on a field intensity of a radio signal which is judged to satisfy a certain requirement regarding noise component among radio signals received from the other of the radio communication device and the other radio communication device. Furthermore, the control unit performs a control of a content according to the distance estimation result.

With such a configuration, the control unit performs a control to prepare for data loss during radio communication of transmission data using a content corresponding to the distance between the radio communication device and the other radio communication device. In other words, the radio communication device is capable of dynamically changing the content of control to prepare for data loss according to communication path conditions.

The radio communication device further includes a data processing unit that adds error correction data to the transmission data, and the control unit may control a data amount of the error correction data, with respect to the transmission data, which is to be added by the data processing unit according to the distance estimation result. For example, the control unit may increase the data amount of the error correction data with respect to the transmission data as a longer distance is estimated.

The radio communication device further includes a reception unit that receives data transmitted by radio. The transmission unit transmits a retransmission request for requesting retransmission of data, which is not correctly received by the reception unit, according to the control of the control unit, and the control unit may control the number of the retransmission requests to be transmitted by the transmission unit according to the distance estimation result. For example, the control unit may increase the number of the retransmission requests as a longer distance is estimated.

The radio communication device further includes a reception unit that receives a radio signal transmitted from the other radio communication device; a measurement unit that measures a field intensity of the radio signal received by the reception unit; a judgment unit that judges whether the radio signal received by the reception unit satisfies the certain requirement regarding noise component; and an estimation unit that estimates a distance from the other radio communication device based on a field intensity of a radio signal, which is judged to satisfy the certain requirement regarding noise component by the judgment unit. The judgment unit may judge that the noise component of the radio signal satisfies the certain requirement regarding noise component when the noise component is greater than a lower limit set value and lower than an upper limit set value.

The reception unit may receive device information, from the other radio communication device in advance, which indicates a transmitting power of the radio signal of the other radio communication device, and the estimation unit may estimate a distance from the other radio communication device using the device information.

The estimation unit may calculate an average value of field intensities of the radio signals which are judged to satisfy the certain requirement by the judgment unit, judge whether the average value is included in any one of classified average value ranges, and estimate that the distance from the other radio communication device is a distance corresponding to the average value range to which the average value is included. Here, the field intensity of the radio signal may be calculated as the average value of transfer average values.

According to the second aspect of the present invention in order to achieve the above-mentioned object, there is provided a radio communication system including a first radio communication device and a second radio communication device. More specifically, the first radio communication device includes a control unit that controls to prepare for data loss during radio communication of transmission data; and a transmission unit that transmits the transmission data by radio according to the control of the control unit. Further, one of the first radio communication device and the second radio communication device estimates a distance from the other based on a field intensity of a radio signal which is judged to satisfy a certain requirement regarding noise component among radio signals received from the other of the first radio communication device and the second radio communication device. Furthermore, the control unit performs a control of a content according to the distance estimation result.

According to the third aspect of the present invention in order to achieve the above-mentioned object, there is provided a program for causing a computer to function as a control unit for controlling to prepare for data loss during radio communication of transmission data using a content according to a distance estimation result, wherein the computer is provided to a radio communication device including a transmission unit that transmits transmission data by radio and performing radio communication with other radio communication device, and one of the radio communication device and the other radio communication device estimates a distance from the other based on a field intensity of a radio signal which is judged to satisfy a certain requirement regarding noise component among radio signals received from the other of the radio communication device and the other radio communication device.

Such a program can control a hardware resource of computer including a CPU, an ROM or an RAM to execute the function of the above control unit. In other words, it is possible to have a computer using the program function as the above control unit.

According to the fourth aspect of the present invention in order to achieve the above-mentioned object, there is provided a radio communication method including the steps of: receiving a radio signal; measuring a field intensity of the received radio signal; judging whether the received radio signal satisfies a certain requirement regarding noise component; estimating a distance from a transmission source device of the radio signal based on a field intensity of the radio signal, which is judged to satisfy the certain requirement regarding noise component; controlling to prepare for data loss during radio communication of transmission data by using a content according to the distance estimation result; and transmitting the transmission data by radio according to the control.

ADVANTAGEOUS EFFECTS OF INVENTION

As described above, in the radio communication device, radio communication system, program and radio communication method according to the present invention, the content of the control to prepare for data loss can be dynamically changed according to communication path conditions.

BRIEF DESCRIPTION OF DRAWINGS

FIG. 7 is an explanatory view showing a relationship between distance measurement evaluation values and estimated distances.

FIG. 8 is an explanatory view showing an example in which device information and evaluation formula are stored in association with each other in a memory unit.

FIG. 9 is an explanatory view showing an illustrative example of distances between a plurality of radio communication devices and field intensities before filtering by a judgment unit.

FIG. 10 is an explanatory view showing an illustrative example of distances between a plurality of radio communication devices and field intensities after filtering by the judgment unit.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, Description of Embodiments will be described in order of the following items.

[1] Outline of radio communication system according to first embodiment
[2] Radio communication device according to first embodiment
  [2-1] Hardware configuration of radio communication device according to first embodiment
  [2-2] Functions of radio communication device according to first embodiment
  [2-3] Operation of radio communication device according to first embodiment
[3] Radio communication device according to second embodiment
  [3-1] Developments to achieve second embodiment
  [3-2] Functions of radio communication device according to second embodiment
  [3-3] Operation of radio communication device according to second embodiment
[4] Radio communication device according to third embodiment
  [4-1] Functions of radio communication device according to third embodiment
  [4-2] Operation of radio communication device according to third embodiment
[5] Conclusion

[1] Outline of Radio Communication System According to First Embodiment

Firstly, a radio communication system 1 according to a first embodiment will be schematically described with reference to FIG. 1.

Figure 1:
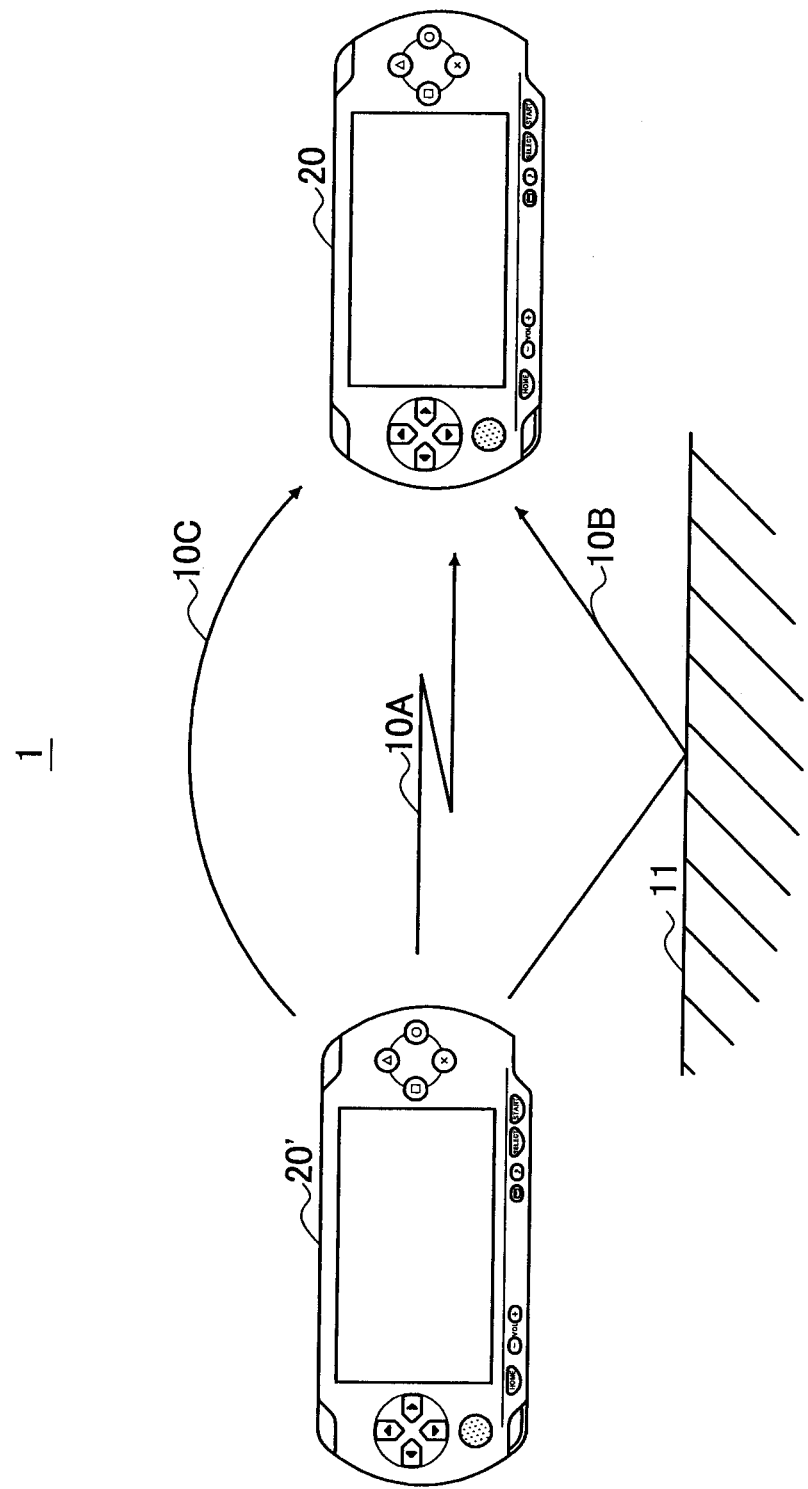
FIG. 1 is an explanatory view showing a configuration of a radio communication system according to the present embodiment.

FIG. 1 is an explanatory view showing a configuration of the radio communication system 1 according to the first embodiment. As shown in FIG. 1, the radio communication system 1 according to the present embodiment includes a plurality of radio communication devices 20 and 20'.

The radio communication devices 20 and 20' are capable of transmitting/receiving radio signals including various data (streaming data, distance measurement packets and the like) to/from each other. The various data include audio data such as music, lectures and radio programs, video data such as movies, TV programs, video programs, photographs, documents, paintings and graphic charts or other any data such as games and software.

Further, in FIG. 1, portable game machines are shown as examples of the radio communication devices 20 and 20'; however, the radio communication devices 20 and 20' are not limited to those portable game machines. For example, the radio communication devices 20 and 20' may be information processing devices such as PCs (Personal Computers), household video processors (DVD recorder, videocassette recorder and the like), mobile phones, PHSs (Personal Handyphone Systems), portable music players, portable video processors, PDAs (Personal Digital Assistants), household game machines and household electric appliances.

Here, the radio communication devices 20 and 20' may perform radio communication using a frequency bandwidth of 2.4 GHz that is specified in IEEE 802.11b or may perform radio communication using a frequency bandwidth specified in IEEE 802.11a, g and n. Further, the radio communication devices 20 and 20' may operate using ZigBee that is specified in IEEE 802.15.4. Further, FIG. 1 shows the radio communication system 1 of an ad-hoc mode in which the radio communication devices 20 and 20' directly communicate with each other; however, the radio communication system 1 may be in an infrastructure mode in which the radio communication devices 20 and 20' communicate via a base station. Furthermore, in the radio communication system 1, in addition to point-to-point radio communication but also point-to-multipoint or multipoint-to-multipoint radio communication can be realized.

The field intensity of a radio signal transmitted from the radio communication device 20 or 20' are affected by interference fading, polarization fading, skip fading or the like. Interference fading is a phenomenon in which radio signals, which are propagated via a plurality of paths and come to a receiving point, interfere with each other at the receiving point. Further, polarization fading is a phenomenon in which a rotation of a plane of polarization occurs during a propagation of radio signals and radio waves having different planes of polarization interfere with each other at a receiving point. Furthermore, skip fading is a phenomenon in which an interference occurs due to an affect of the ionosphere around the earth.

For example, as shown in FIG. 1, when the radio communication device 20' transmits a radio signal, the radio communication device 20 receives the radio signal as a direct wave 10A, a reflected wave 10B (reflected by a subject 11) or a diffracted wave 10C, for example.

Thus, the field intensity of the radio signal received by the radio communication device 20 from the radio communication device 20' constantly varies. Particularly, since the portable game machines described as examples of the radio communication devices 20 and 20' have a low transmitting power, those portable game machines are easily affected by fading. Thus, a radio communication device cannot estimate an accurate distance from the transmission source device of the radio signal by using the field intensity of all radio signals received in a certain period of time.

Thus, in view of the above issue, the radio communication device 20 according to the first embodiment has been created. In the radio communication device 20 according to the first embodiment, a distance from a transmission source of a radio signal can be estimated with a higher degree of accuracy. The radio communication device 20 will be described in detail with reference to FIGS. 2 to 15.

[2] Radio Communication Device According to First Embodiment

Figure 2:
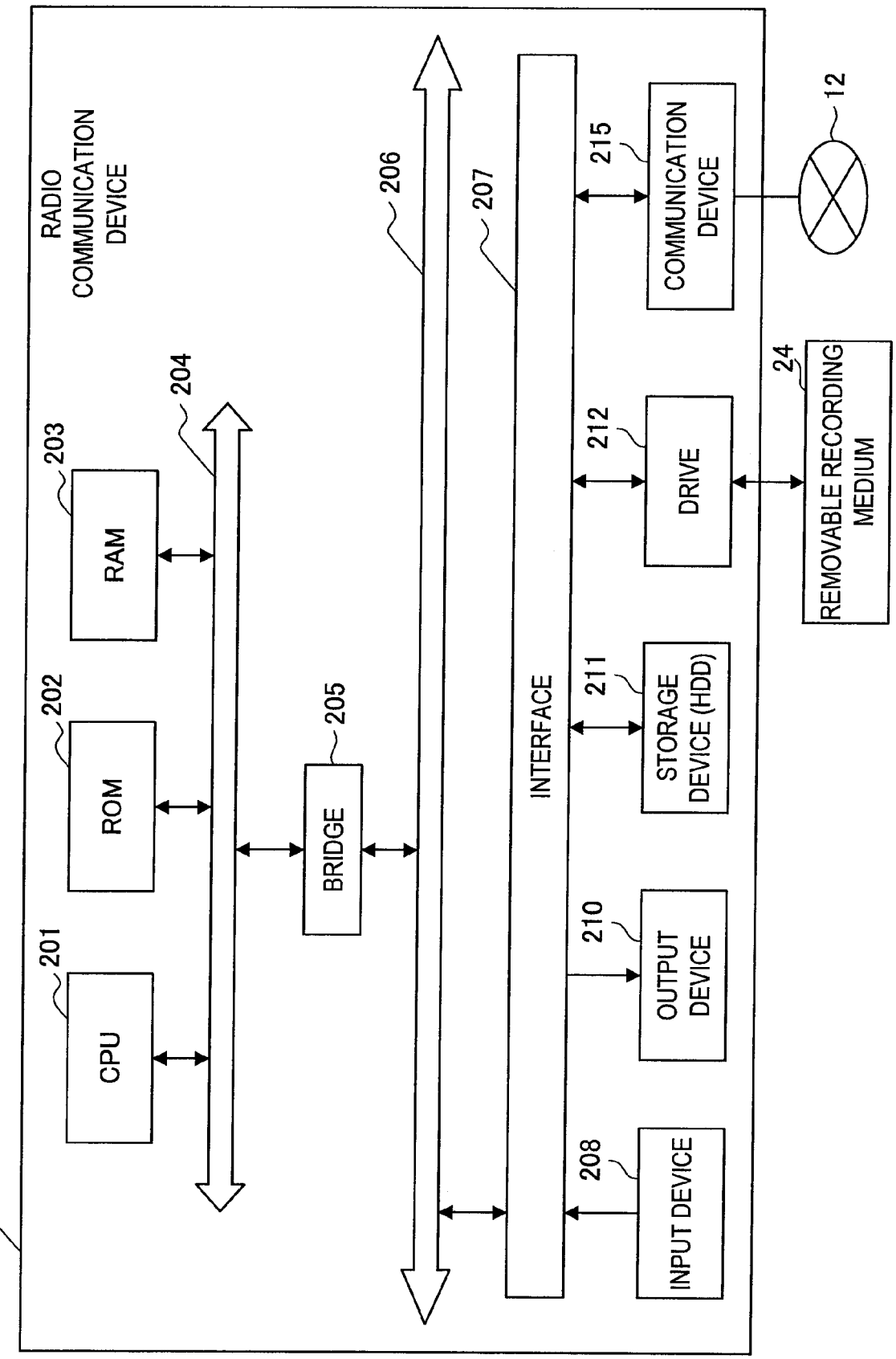
FIG. 2 is a block diagram showing a hardware configuration of a radio communication device.

[2-1] Hardware Configuration of Radio Communication Device According to the First Embodiment FIG. 2 is a block diagram showing a hardware configuration of the radio communication device 20. The radio communication device 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212 and a communication device 215.

The CPU 201 functions as an arithmetic processing device and a control device, and controls the overall operation of the radio communication device 20 according to various programs. Further, the CPU 201 can be a microprocessor. The ROM 202 stores programs, arithmetic parameters and the like which are used by the CPU 201. The RAM 203 temporarily stores programs used by the CPU 201 and parameters and the like which varies as appropriate during an implementation of the programs. These are connected to one another by the host bus 204 composed of a CPU bus and the like.

The host bus 204 is connected to the external bus 206 such as a PCI (Peripheral Component Interconnect/Interface) bus via the bridge 205. Note that the host bus 204, bridge 205 and external bus 206 do not have to be separately provided and those functions may be mounted in a single bus.

The input device 208 is composed of an input means, which is used by a user to input information, such as a mouse, a keyboard, a touch panel, a button, a microphone, a switch and a lever, and an input control circuit for generating input signals based of user's input and outputting to the CPU 201. By operating the input device 208, the user of the radio communication device 20 can input various data and instruct processing operation to the radio communication device 20.

The output device 210 is composed of a display device such as a CRT (Cathode Ray Tube) display device, a liquid crystal display (LCD) device, an OLED (Organic Light Emitting Diode) device and a lamp, and an audio output device such as a speaker and a headphone. The output device 210 outputs a reproduced content, for example. Specifically, the display device displays various information such as reproduced video data and the like in form of texts or images. On the other hand, the audio output device converts reproduced sound data and the like to sound and outputs the sound.

The storage device 211 is a data storing device composed as an example of a memory unit of the radio communication device 20 according to the present embodiment. The storage device 211 may include a memory medium, a recording device for recording data to the memory medium, a readout device for reading data from the memory medium, a deletion device for deleting data recorded in the memory medium, and the like. The storage device 211 is composed of a HDD (Hard Disk Drive) for example. The storage device 211 drives a hard disk and stores programs and various data which are executed by the CPU 201. Further, in the storage device 211, later described field intensity, noise floor and the like are recorded in association with users.

The drive 212 is a reader/writer for a memory medium and internally mounted in or externally connected to the radio communication device 20. The drive 212 reads information from an attached magnetic disc, optical disc, magnetic-optical disc, or a removable recording memory 24 such as a semiconductor memory, and outputs to the RAM 203.

The communication device 215 is a communication interface composed of a communication device for connecting to a communication network 12, for example. Further, the communication device 215 may be a communication device for a wireless LAN, a communication device for a wireless USB, or a wired communication device for a wired communication. The communication device 215 transmits/receives radio signals to/from other radio communication device 20'.

Here, the hardware configuration of the radio communication device 20' can substantially be the same as the hardware configuration of the above described radio communication device 20, so the detailed description will be omitted.

[2-2] Functions of Radio Communication Device According to First Embodiment

The hardware configuration of the radio communication device 20 has been described with reference to FIG. 2. Next, functions of the radio communication device 20 according to the present embodiment will be described.

Figure 3:
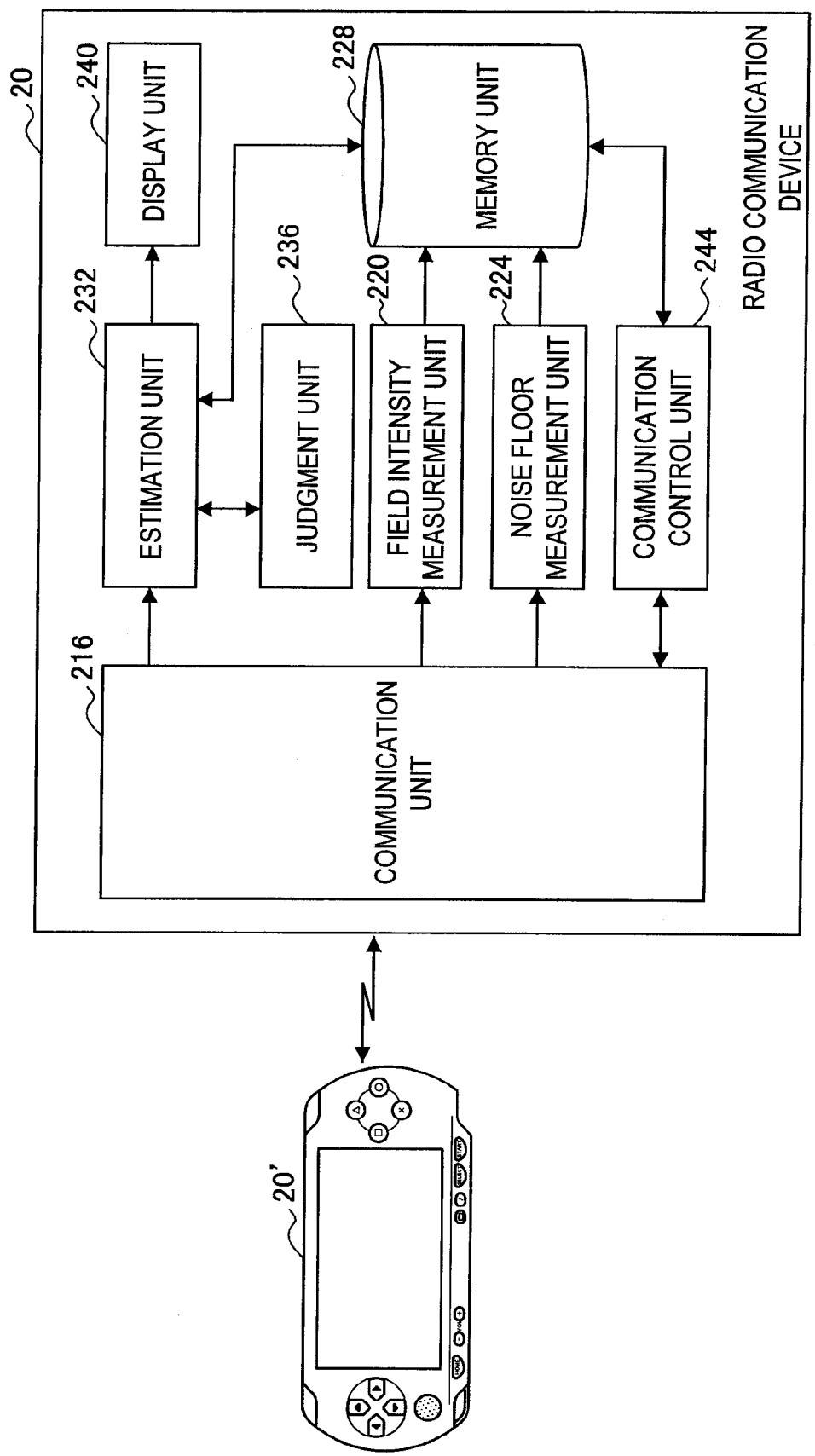
FIG. 3 is a functional block diagram showing a configuration of the radio communication device.

FIG. 3 is a functional block diagram showing the configuration of the radio communication device 20 according to the first embodiment. As shown in FIG. 3, the radio communication device 20 includes a communication unit 216, a field intensity measurement unit 220, a noise floor measurement unit 224, a memory unit 228, an estimation unit 232, a judgment unit 236, a display unit 240 and a communication control unit 244.

The communication unit 216 is an interface for transmitting/receiving radio signals such as a distance measurement packet or streaming data to/from other radio communication device 20' and has functions as a transmission unit and a reception unit.

The other radio communication device 20' generates a distance measurement packet and periodically transmits to the radio communication device 20. The distance measurement packet is a packet used by the radio communication device 20 to measure the distance between the radio communication device 20 and the radio communication device 20'. When there are data to be transmitted from the other radio communication device 20' to the radio communication device 20, the data can be included in the distance measurement packet. Further, the distance measurement packet has a data amount equal to or greater than 1 byte. Note that the radio communication device 20 can estimate the distance from the radio communication device 20' based on streaming data without using the distance measurement packet.

Further, the communication unit 216 receives device information that indicates a transmitting power of the radio communication device 20' before receiving the distance measurement packet.

Figure 4:
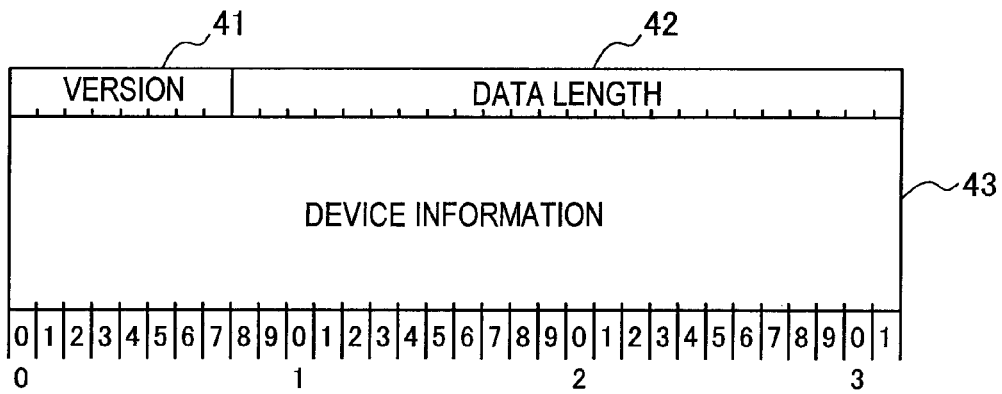
FIG. 4 is an explanatory view showing a configuration example of packet including device information.

FIG. 4 is an explanatory view showing an example of a packet configuration including device information. This packet includes, as shown in FIG. 4, a version 41 which is 8 bytes in length and is a value of format version of the packet, a data length 42 of the packet and device information 32.

Figure 5:
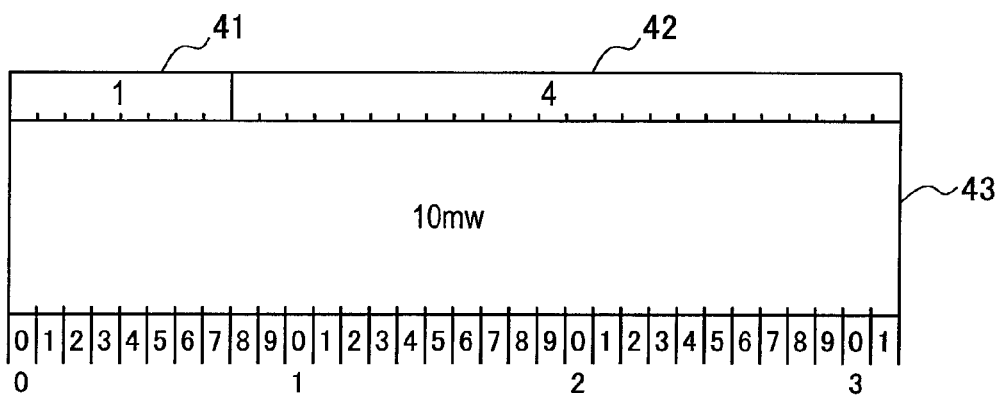
FIG. 5 is an explanatory view showing an illustrative example of the packet including the device information.
Figure 6:
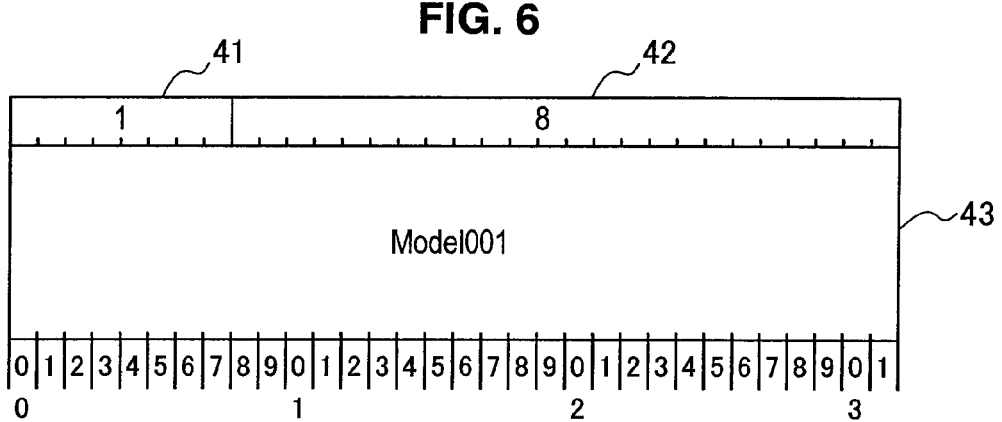
FIG. 6 is an explanatory view showing an illustrative example of the packet including the device information.

FIGS. 5 and 6 are explanatory views showing illustrative examples of a packet including device information. In the example shown in FIG. 5, the version 41 is "1," the data length 42 is "4," and the device information 32 is "10 mw." The "10 mw" written as the device information 32 is a transmitting power of the radio communication device 20' upon transmitting a radio signal.

Further, in the example shown in FIG. 6, the version 41 is "1," the data length 42 is "8," and the device information 32 is "Model001." The "Model001" written as the device information 32 is an antenna type of the radio communication device 20' or radio communication device 20'. Base on the type, a transmitting power of the radio communication device 20' can be specified.

As described above, since the communication unit 216 receives device information including a transmitting power or a type of the radio communication device 20' in advance, the estimation unit 232 is allowed to estimate the distance from the radio communication device 20' according to the content of the device information. Note that the format of the packet including the device information is not limited to the example shown in FIG. 4 and any format such as a serial number of the radio communication device 20' can be used if it can be recognized between applications (programs) of the radio communication device 20 and radio communication device 20'.

The field intensity measurement unit 220 has a function as a measurement unit for measuring a field intensity (reception intensity) of the distance measurement packet received by the communication unit 216. The field intensity measurement unit 220 may obtain the field intensity from an API (Application Program Interface), a function, a driver applicable to a wireless hardware, or the like.

The noise floor measurement unit 224 measures a noise floor indicating a level of noise included in the distance measurement packet received by the communication unit 216. In general, differently from an S/N (signal-to-noise) ratio, a greater value of the noise floor indicates a worse radio wave environment (a larger noise component) and a smaller value indicates a better radio wave environment (a smaller noise component). The noise floor measurement unit 224 may obtain the noise floor from an API (Application Program Interface), a function, a driver applicable to a wireless hardware, or the like.

The memory unit 228 stores the field intensity of the distance measurement packet that is measured by the field intensity measurement unit 220 and the noise floor of the distance measurement packet that is measured by the noise floor measurement unit 224. Further, the memory unit 228 stores the device information received by the communication unit 216 in advance in association with a later described threshold value N and threshold value F, an evaluation formula or the like.

Here, the memory unit 228 may be a memory medium of a nonvolatile memory such as an EEPROM (Electrically Erasable Programmable Read-Only Memory) and an EPROM (Erasable Programmable Read Only Memory), a magnetic disc such as a hard disk and a magnetic substance disk, an optical disc such as a CD-R (Compact Disc Recordable), a /RW (ReWritable), a DVD-R (Digital Versatile Disc Recordable) a /RW/+R/+RW/RAM (Ramdam Access Memory) and a BD (Blu-Ray Disc (registered trademark))-R/BD-RE, or an MO (Magneto Optical) disc.

The estimation unit 232 estimates a distance from the radio communication device 20' using the field intensity and the noise floor value, which is judged by the judgment unit 236 to satisfy a certain requirement, among the field intensities and noise floor values stored in memory unit 228. Hereinafter, a judgment by the judgment unit 236 will be described after a specific description of the functions of the estimation unit 232.

Firstly, the estimation unit 232 maintains a pair of a field intensity and a noise floor value which is judged by the judgment unit 236 to satisfy a certain requirement as a distance measurement database. Then, when the following requirement A is satisfied, a distance measurement evaluation value is calculated.
(Requirement A)
1. A set period has passed.
2. The number of pairs of the field intensity and noise floor value is increased by a constant number.
3. The accumulated number of pairs of the field intensity and noise floor value excesses a certain value.

One of the above 1 to 3 or a combination.

Note that the distance measurement evaluation value may be an average value of field intensities in the distance measurement database or a latest field intensity. As shown in FIG. 7, for example, the estimation unit 232 estimates the distance between the radio communication devices 20 and 20' based on the amount of the distance measurement evaluation value.

FIG. 7 is an explanatory view showing a relationship between distance measurement evaluation values and estimated distances. As shown in FIG. 7, when the distance measurement evaluation value is smaller than the threshold value F, the estimation unit 232 estimates that the distance between the radio communication devices 20 and 20' is a long distance. Further, when the distance measurement evaluation value is greater than the threshold value N, the estimation unit 232 estimates that the distance between the radio communication devices 20 and 20' is a short distance. Further, when the distance measurement evaluation value is equal to or greater than the threshold value F or equal to or smaller than the threshold value N, the estimation unit 232 estimates that the distance between the radio communication devices 20 and 20' is a medium distance.

Note that the threshold value N and threshold value F may be stored in association with device information in the memory unit 228. In this case, the estimation unit 232 may extract the threshold value N and threshold value F from the memory unit 228, which correspond to the device information received from the radio communication device 20' in advance. It is assumed that the threshold value N and threshold value F associated with device information that indicates a relatively high transmitting power tend to be relatively great values.

Further, as a substitute for the threshold value N and threshold value F, a evaluation formula for calculating a distance measurement evaluation value may be associated with the device information and stored in the memory unit 228 as shown in FIG. 8.

FIG. 8 is an explanatory view showing an example in which device information and evaluation formulas are associated and stored in the memory unit 228. More specifically, device information "Model001" is associated with an evaluation formula 1 and device information "Model002" is associated with an evaluation formula 2. Device information "Model003" and device information "Model004" are also associated with evaluation formulas.

For example, the evaluation formula 1 may be (added value of latest three field intensities)/3, and the evaluation formula 2 may be (added value of latest three field intensities)/4.

Since each radio communication device 20' has different antenna shape, product shape, transmitting power or the like, in the radio communication device 20, it has been difficult to accurately estimate the distance between the radio communication devices 20 and 20' based on only the field intensity. Thus, when the device information is associated with a threshold value N, a threshold value F, and an evaluation formula and stored in the memory unit 228, the estimation unit 232 can perform a distance estimation for the radio communication device 20'.

The judgment unit 236 judges whether the pair of the field intensity and noise floor value stored in the memory unit 228 satisfy a certain requirement. Here, when the noise floor value is greater than an upper limit set value, it is assumed that the reception environment for receiving the distance measurement packet by the communication unit 216 is remarkably deteriorated. Further, when the noise floor value is lower than a lower limit set value, it is assumed that the reception environment for receiving the distance measurement packet by the communication unit 216 is excessively good. Thus, when the noise floor value is greater than the lower limit set value and lower than the upper limit set value, it is assumed that the reception environment for receiving the distance measurement packet by the communication unit 216 is almost in a steady state.

Thus, among the pairs of the field intensity and noise floor value, the judgment unit 236 judges that a pair having a noise floor value that is equal to or greater than the lower limit set value and equal to or lower than the upper limit set value satisfies the certain requirement and adds the pair to the distance measurement database maintained by the estimation unit 232. In other words, the judgment unit 236 filters a pair of the field intensity and noise floor value that is to be used by the estimation unit 232 among the pairs of the field intensity and noise floor value stored in the memory unit 228. Note that the judgment unit 236 may perform filtering when a pair of the field intensity and noise floor is recorded in the memory unit 228. A manner of filtering by the judgment unit 236 will be described with reference to FIGS. 9 and 10.

FIG. 9 is an explanatory view showing an illustrative example of distances between the radio communication devices 20 and 20' and the field intensities before filtering by the judgment unit 236. More specifically, FIG. 9 shows field intensities obtained in respective distances as changing the distance between the radio communication devices 20 and 20' to a plurality of distances. As shown in FIG. 9, before filtering by the judgment unit 236, the obtained field intensity varies in a range even when the distance of the radio communication devices 20 and 20' is the same.

FIG. 10 is an explanatory view showing an illustrative example of distances between the radio communication devices 20 and 20' and the field intensities after filtering by the judgment unit 236. As shown in FIG. 10, after the filtering by the judgment unit 236, the range in which the field intensity varies is smaller while the distance between the radio communication devices 20 and 20' is the same compared to the case before the filtering by the judgment unit 236.

As described above, when the field intensity used by the estimation unit 232 is filtered by the judgment unit 236 based on the noise floor value, the estimation unit 232 can estimate distance between the radio communication devices 20 and 20' based on reliable field intensities. As a result, the accuracy of distance estimation by the estimation unit 232 will be improved. Hereinafter, an illustrative example of the distance estimation by the estimation unit 232 will be described with reference to FIG. 11.

Figure 11:
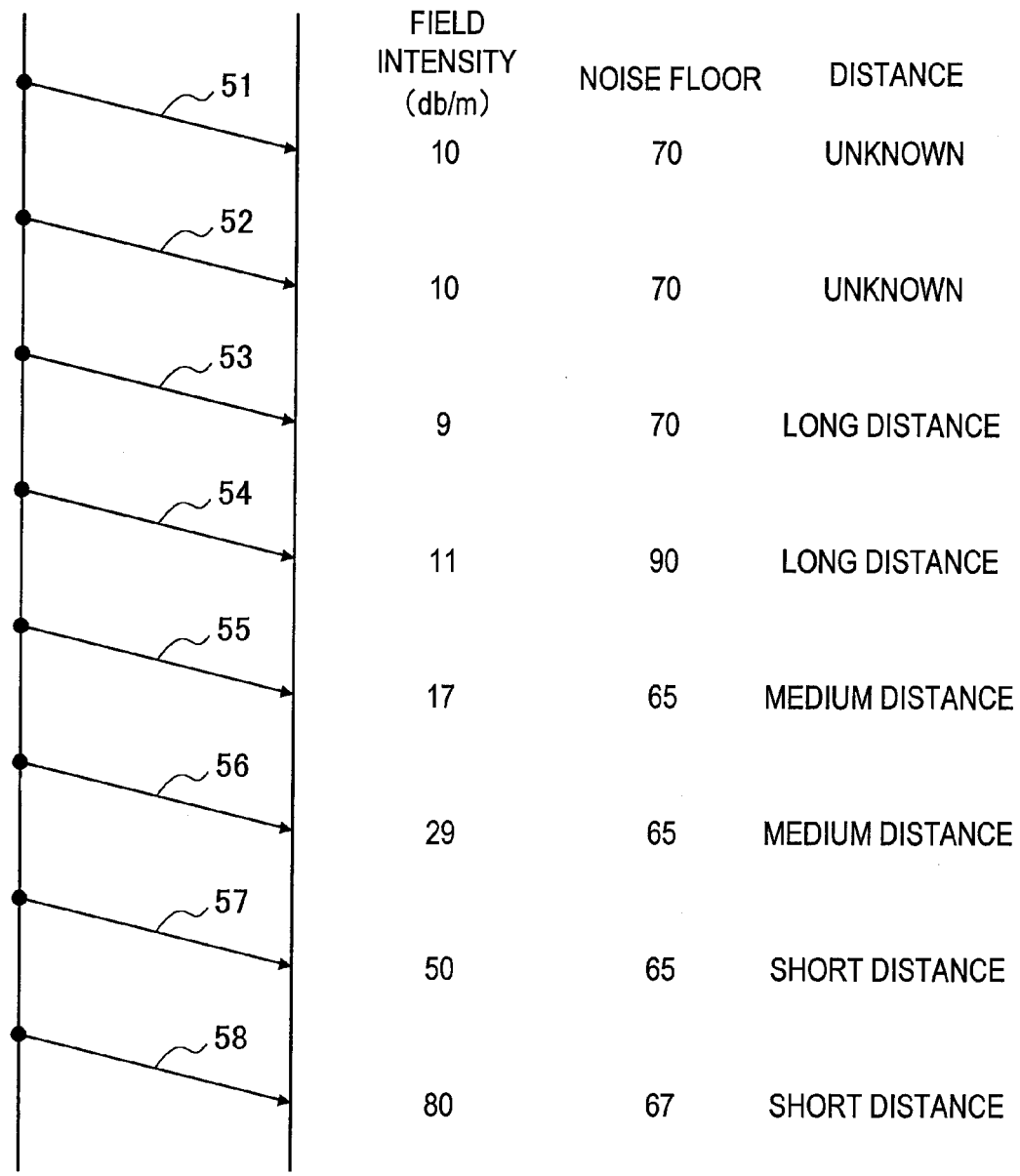
FIG. 11 is an explanatory view showing an illustrative example of a distance estimation by an estimation unit.

FIG. 11 is an explanatory view showing an illustrative example of a distance estimation by the estimation unit 232. Here, it is assumed that, in the requirement A, three or more pairs of the field intensity and noise floor value are stored as the distance measurement database, and the lower limit set value is 50 and the upper limit set value is 70, which are used for filtering by the judgment unit 236. The estimation unit 232 calculates a distance measurement evaluation value by averaging the last three field intensities and sets as threshold value F=10 and threshold value N=30.

As described in FIG. 11, firstly, the radio communication device 20 receives the distance measurement packet 51. Then, the radio communication device 20 measures a field intensity of the distance measurement packet 51 as 10 db/m and a noise floor as 70. Since the noise floor of the distance measurement packet 51 satisfies the certain requirement of the judgment unit 236, the pair of the field intensity and noise floor of the distance measurement packet 51 is maintained as a distance measurement database in the estimation unit 232. However, the number of the pairs of the field intensity and noise floor maintained as the distance measurement database in the estimation unit 232 has not reached three, so the estimation unit 232 concludes that the requirement A is not satisfied and the distance from the radio communication device 20' is unknown.

Next, the radio communication device 20 receives a distance measurement packet 52. Then, the radio communication device 20 measures the field intensity of the distance measurement packet 52 as 10 db/m and the noise floor as 70. Since the noise floor of the distance measurement packet 52 satisfies the certain requirement of the judgment unit 236, the pair of the field intensity and noise floor of the distance measurement packet 52 is stored as the distance measurement database in the estimation unit 232. However, the number of the pairs of the field intensity and noise floor maintained as the distance measurement database of the estimation unit 232 has not reached three, so the estimation unit 232 concludes that the requirement A is not satisfied and the distance from the radio communication device 20' is unknown.

After that, the radio communication device 20 receives a distance measurement packet 53. Then, the radio communication device 20 measures the field intensity of the distance measurement packet 53 as 9 db/m and the noise floor as 70. Since the noise floor of the distance measurement packet 53 satisfies the certain requirement of the judgment unit 236, the pair of the field intensity and noise floor of the distance measurement packet 53 is maintained as the distance measurement database in the estimation unit 232. Further, the number of pairs of the field intensity and noise floor maintained as the distance measurement database of the estimation unit 232 has reached three, so the estimation unit 232 calculates the distance measurement evaluation value as (10+10+9)/3=9.666 . . . . Since this distance measurement evaluation value is smaller than the threshold value F, the estimation unit 232 estimates that the distance from the radio communication device 20' is a long distance.

Further, the radio communication device 20 receives a distance measurement packet 54. Then, the radio communication device 20 measures the field intensity of the distance measurement packet 54 as 11 db/m and the noise floor as 90. The noise floor of the distance measurement packet 54 does not satisfy the certain requirement (the upper limit set value is greater than 70) of the judgment unit 236, the pair of the field intensity and noise floor of the distance measurement packet 54 is not used by the estimation unit 232. However, the number of pairs of the field intensity and noise floor maintained as the distance measurement database in the estimation unit 232 has reached three, so the estimation unit 232 calculates the distance measurement evaluation value as (10+10+9)/3=9.666 . . . . Since this distance measurement evaluation value is smaller than the threshold value F, the estimation unit 232 estimates the distance from the radio communication device 20' is a long distance.

Next, the radio communication device 20 receives a distance measurement packet 55. Then, the radio communication device 20 measures the field intensity of the distance measurement packet 55 as 17 db/m and the noise floor as 65. Since the noise floor of the distance measurement packet 55 satisfies the certain requirement of the judgment unit 236, the pair of the field intensity and noise floor of the distance measurement packet 55 is maintained as the distance measurement database in the estimation unit 232. Further, the number of pairs of the field intensity and noise floor maintained as the distance measurement database of the estimation unit 232 has reached three, so the estimation unit 232 calculates the distance measurement evaluation value as (10+9+17)/3=12. Since this distance measurement evaluation value is greater than the threshold value F and smaller than the threshold value N, the estimation unit 232 estimates that the distance from the radio communication device 20' is a medium distance.

When distance measurement packets 56 to 58 are received, the estimation unit 232 operates in the same manner and estimates that the distance from the radio communication device 20' approaches to a short distance, as described below in detail. The distance from the radio communication device 20' estimated by the estimation unit 232 may be displayed on the display unit 240. Further, the distance from the radio communication device 20' estimated by the estimation unit 232 may be used in a selected application.

Here, back to the explanation of the configuration of the radio communication device 20 with reference to FIG. 3, the communication control unit 244 has a function as a control unit for controlling a distance measurement packet transmission by the communication unit 216. Hereinafter, the purpose of the provision of the communication control unit 244 and detail functions thereof will be described.

As described with reference to FIG. 11, the radio communication device 20 can estimate the distance from the radio communication device 20' by receiving a distance measurement packet from the radio communication device 20'. Further, as a method that the radio communication device 20' estimates the distance from the radio communication device 20, a method that a distance measurement packet is sent from the radio communication device 20 can be considered.

However, if the radio communication device 20 simply transmits a distance measurement packet every predetermined period even when the radio communication device 20' has not been in a radio wave coverage, the communication resource is used unnecessarily.

Here, when the radio communication device 20 has received a distance measurement packet from the radio communication device 20', it is likely that the radio communication device 20' is in the radio wave coverage of the radio communication device 20. On the other hand, when the radio communication device 20 cannot receive a distance measurement packet from the radio communication device 20', it is likely that the radio communication device 20' is out of the radio wave coverage of the radio communication device 20 or the packet may be lost due to a deteriorated radio wave condition.

Then, for example, the radio communication device 20' is considered as a client, the radio communication device 20 is considered as a server, and the communication control unit 244 is assumed to control to transmit a distance measurement packet to the communication unit 216 when a distance measurement packet from the radio communication device 20' is received. Here, it is assumed that the radio communication device 20' transmits a distance measurement packet every predetermined period (a period of 100 ms, for example).

With the above described configuration, since the communication control unit 244 controls the communication unit 216 to transmit a radio signal in response to a reception of a distance measurement packet, transmission of distance measurement packets which will not reach the radio communication device 20' can be prevented so that the usage of the communication resource amount can be reduced. An illustrative example of radio communication controlled by such communication control unit 244 is shown in FIG. 12.

Figure 12:
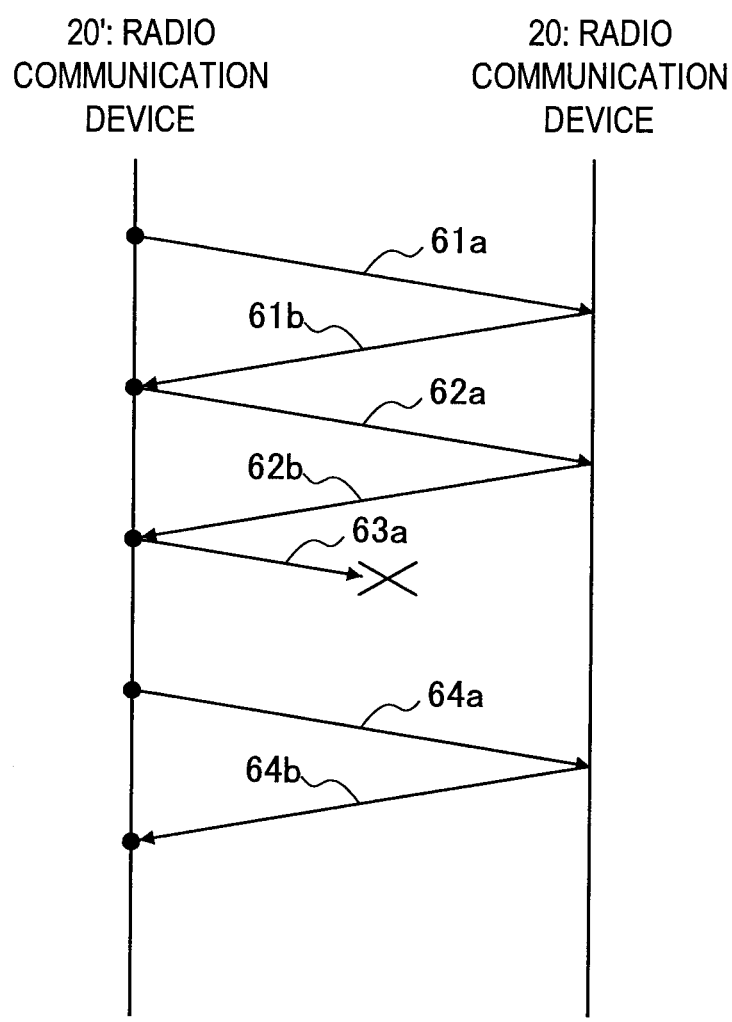
FIG. 12 is an explanatory view showing an illustrative example of radio communication controlled by a communication control unit.

FIG. 12 is an explanatory view showing the illustrative example of the radio communication controlled by the communication control unit 244. As shown in FIG. 12, the radio communication device 20' periodically transmits distance measurement packets 61a, 62a, 63a and 64a. The radio communication device 20 transmits a distance measurement packet 61b in response to a reception of the distance measurement packet 61a. Further, the radio communication device 20 transmits a distance measurement packet 62b in response to a reception of the distance measurement packet 62a.

On the other hand, since the distance measurement packet 63a transmitted from the radio communication device 20' does not reach the radio communication device 20, the radio communication device 20 does not transmit a distance measurement packet to respond the distance measurement packet 63a. After that, the radio communication device 20 transmits a distance measurement packet 64b triggered by a reception of the distance measurement packet 64a. Here, the radio communication device 20 may perform transmitting the distance measurement packet and recoding the field intensity and noise floor of the received distance measurement packet to the memory unit 228, in series or in parallel. Further, the communication control unit 244 may have a function for generating a distance measurement packet.

Here, since the radio communication device 20' can have substantially the same function as that of the radio communication device 20, explanation of detail functions of the radio communication device 20' is omitted.

[2-3] Operation of Radio Communication Device According to First Embodiment

Functions of the radio communication device 20 according to the present embodiment have been described with reference to FIGS. 2 to 12. Next, a radio communication method executed between the radio communication device 20 and the radio communication device 20' will be described with reference to FIGS. 13 to 15.

Figure 13:
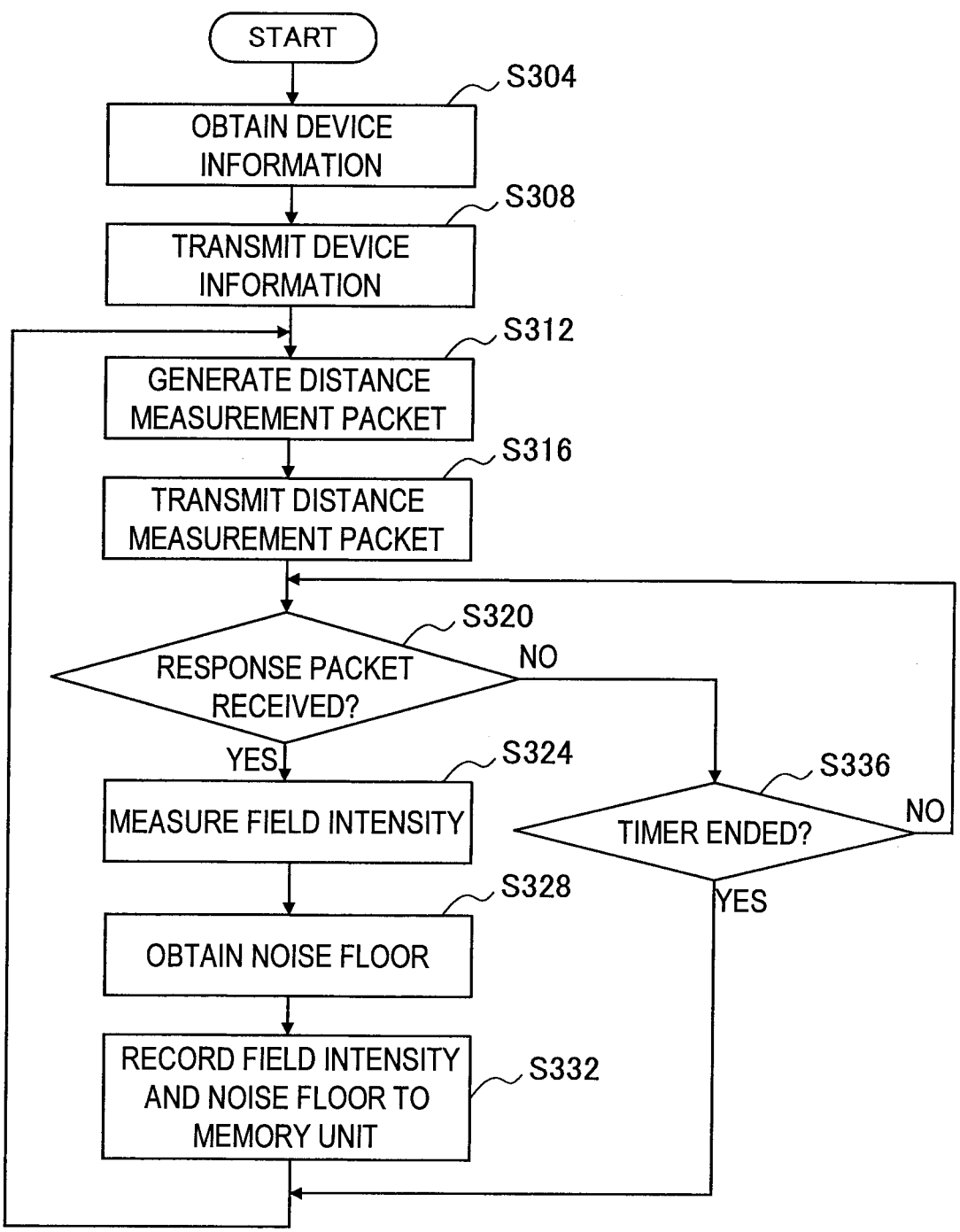
FIG. 13 is a flowchart showing an operation flow of a radio communication device on transmitting side.

FIG. 13 is a flowchart showing an operation flow of the radio communication device 20' on the transmitting side. As shown in FIG. 13, firstly, the radio communication device 20' obtains device information thereof (S304) and transmits the device information to the radio communication device 20 on the receiving side (S308).

After that, the radio communication device 20' generates a distance measurement packet (S312) and transmits the distance measurement packet to the radio communication device 20 on the receiving side (S316). Then, when the radio communication device 20' receives a distance measurement packet from the radio communication device 20 as a response to the transmitted distance measurement packet (S320), the radio communication device 20' measures a field intensity of the received distance measurement packet (S324). Further, the radio communication device 20' obtains a noise floor of the received distance measurement packet (S328). Then, the radio communication device 20' records the field intensity and noise floor to a memory unit (corresponding to the memory unit 228 in FIG. 3) (S332).

Further, when the distance measurement packet is transmitted to the radio communication device 20 on the receiving side (S316) but a distance measurement packet is not received as a response from the radio communication device 20 (S320), the radio communication device 20' judges whether a timer has ended (S336). When the time has ended, the radio communication device 20' repeats the process from S312 and, when the time has not ended, the radio communication device 20' repeats the process from S320.

Figure 14:
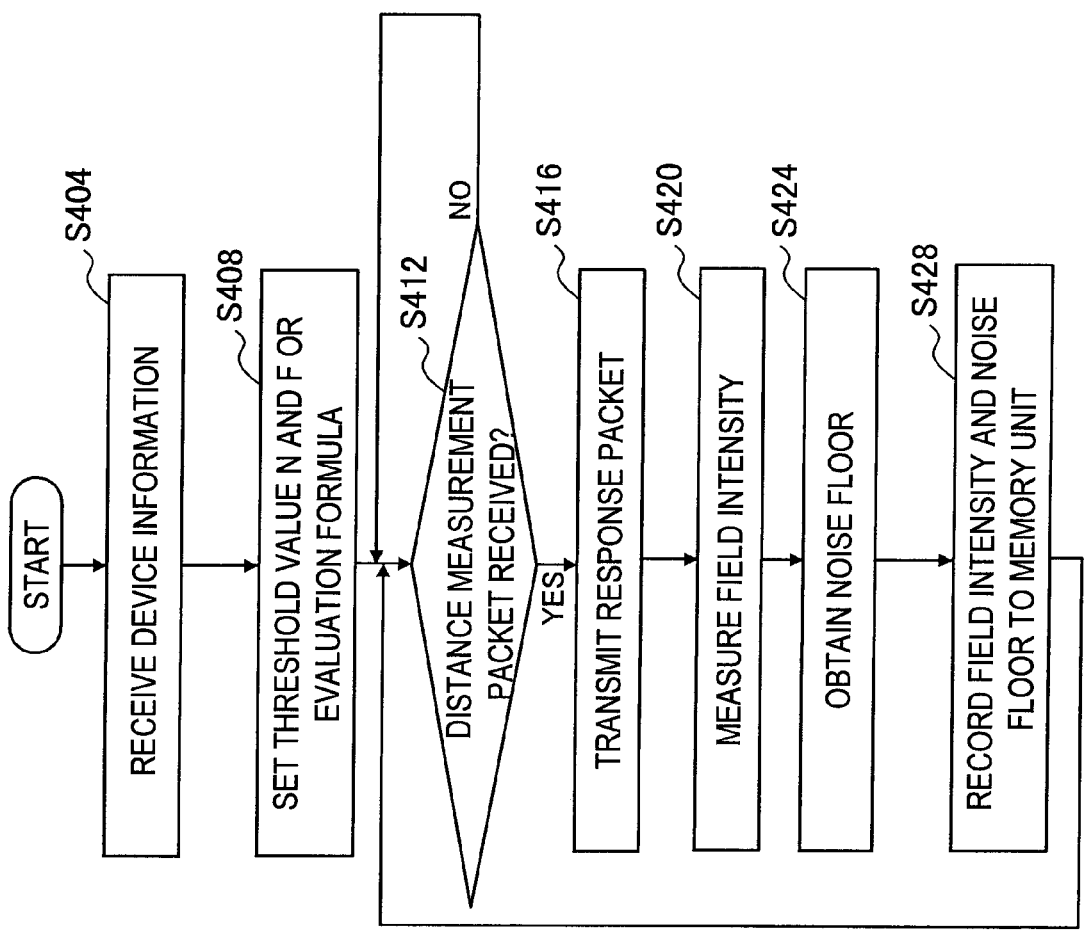
FIG. 14 is a flowchart showing an operation flow of a radio communication device on receiving side.
Figure 15:
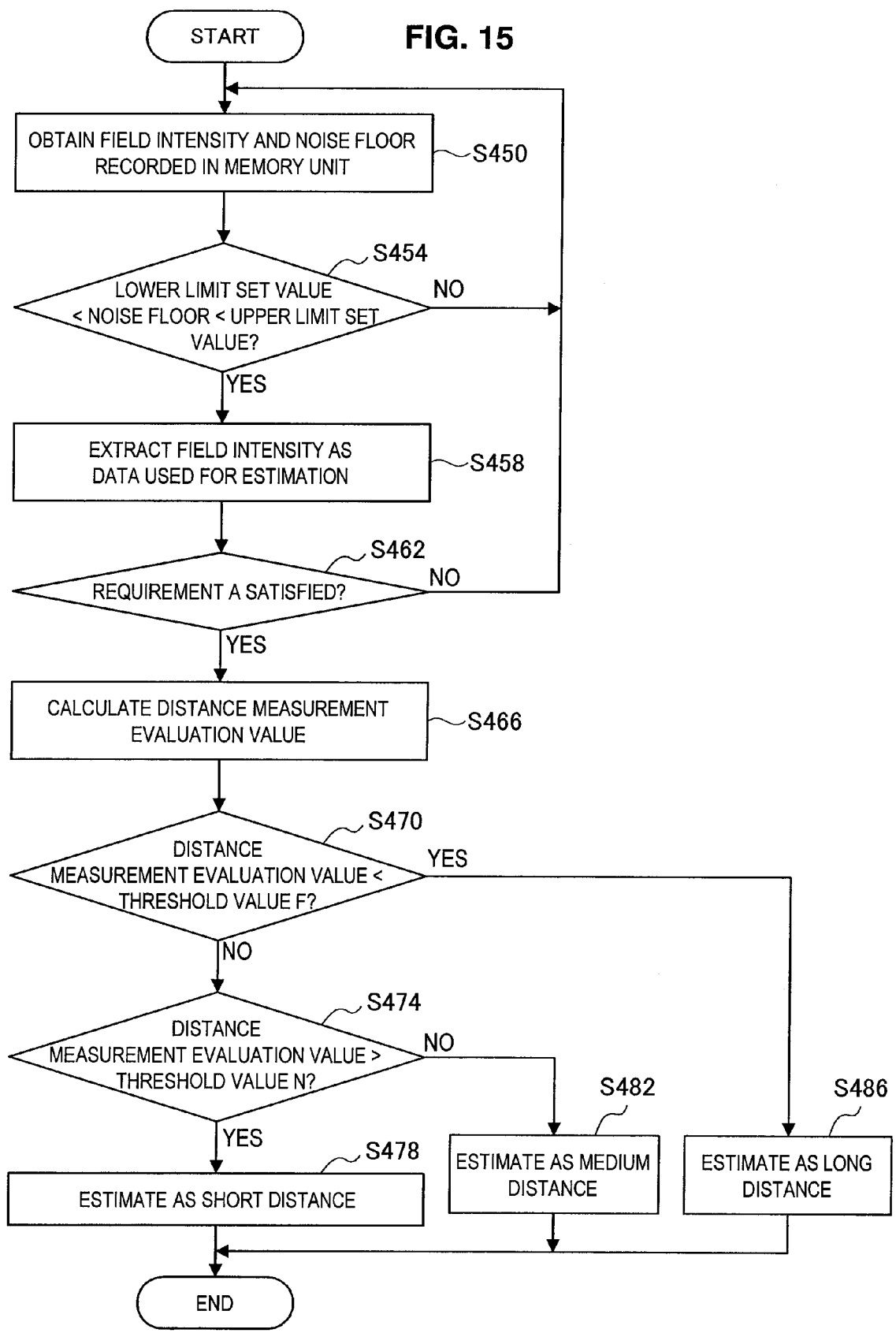
FIG. 15 is a flowchart showing an operation flow of a radio communication device on receiving side.

FIGS. 14 and 15 are flowcharts showing operation flows of the radio communication device 20 on the receiving side. As shown in FIG. 14, firstly, the radio communication device 20 receives device information of the radio communication device 20' from the radio communication device 20' (S404). Then, the estimation unit 232 sets threshold values N and F or an evaluation formula to threshold values N and F or an evaluation formula associated with the received device information and stored in the memory unit 228 (S408).

Then, when a distance measurement packet is received from the radio communication device 20' (S412), in the radio communication device 20, the communication control unit 244 controls the communication unit 216 to transmit a distance measurement packet as a response packet (S416). Further, the field intensity measurement unit 220 measures a field intensity of the received distance measurement packet (S420) and the noise floor measurement unit 224 obtains a noise floor of the received distance measurement packet (S424). Then, the field intensity and noise floor are recorded in the memory unit 228 (S428).

After that, as shown in FIG. 15, the estimation unit 232 obtains the pairs of the field intensity and noise floor stored in the memory unit 228 (S450). Next, the judgment unit 236 judges whether the noise floor value included in the respective pairs of the field intensity and noise floor is greater than the lower limit set value and smaller than the upper limit set value (S454). Then, the judgment unit 236 extracts a field intensity of the pair of the noise floor, which is judged to be smaller than the upper limit set value, as data to be used by the estimation unit 232, and controls the estimation unit 232 to maintain the data as distance measurement database (S458).

Further, the estimation unit 232 judges whether the above requirement A is satisfied and, when the requirement A is satisfied, calculates a distance measurement evaluation value according to the distance measurement database and a previously set evaluation formula (S466). Then, when the distance measurement evaluation value is smaller than the threshold value F (S470), the estimation unit 232 estimates that the distance relation with the radio communication device 20' is a long distance (S486).

On the other hand, when the distance measurement evaluation value is greater than the threshold value F (S470) and smaller than the threshold value N (S474), the estimation unit 232 estimates that the distance relationship with the radio communication device 20' is a medium distance (S482). Further, when the distance measurement evaluation value is greater than the threshold value F (S470) and greater than threshold value N (S474), the estimation unit 232 estimates that the distance relationship with the radio communication device 20' is a short distance (S478).

[3] Radio Communication Device According to Second Embodiment

The first embodiment of the present invention has been described with reference to FIGS. 1 to 15. Next, a second embodiment of the present invention will be described with reference to FIGS. 16 to 21 after an explanation of developments to achieve the second embodiment of the present invention.

[3-1] Developments to Achieve Second Embodiment

Recently, content data such as image data and audio data have been widely transferred via various communication media such as the Internet. Especially, in recent years, regarding data transferring via the Internet, service using a stream transmission method has been increased in addition to a conventional download transmission method.

In the download transmission method, a receiving terminal firstly downloads content data (multimedia data) such as video data and audio data from a transmitter (a contents distribution server, for example) and records the data in a memory medium. After that the receiving terminal reads the content data from the memory medium to reproduce. Thus, basically in such a download transmission method, since the reproduction cannot be started before the transferring of content data is completed, the download transmission method is not effective for a long time reproduction or a real-time reproduction.

On the other hand, the later stream transmission method is a method in which a receiving terminal executes a reproduction process of content data in parallel while content data is being transferred from a transmitter. Such a stream transmission method is applied widely to Internet services that require real-time performance such as Internet telephone, remote video conference and video on demand.

In such a stream transmission method, for example, MPEG stream of image data generated by an MPEG (Moving Picture Experts Group) compression process is transferred as an IP (Internet Protocol) packet via the Internet. Such a stream transmission method is used in a system in which various communication terminals such as a PC, a PDA and a mobile phone serve as a receiver and has been developed.

Here, regarding the Internet technology that is preferable to the stream transmission method, a protocol called RTP (Real time Transport Protocol) is specified in IETF RFC (Internet Engineering Task Force Request For Comment) 1889.

In a data transfer according to RTP, a time stamp is added to a packet as time information. Then, the receiver recognizes time relationship between the transmitter and the receiver by referring to the time stamp so that synchronized reproduction can be realized regardless of influence of delay jitter of a packet transfer or the like.

Note that the RTP does not guarantee a real-time data transfer. Since the priority, settings or management of packet transfer is not covered by the transport service provided by the RTP, RTP packets may be affected by a transfer delay or packet loss on the network, similarly to other packets. However, even if such a situation occurs, the receiver can reproduce data using only packets arrived within an expected period of time.

This is because reproduction in lower data quality or reproduction by correcting data can be allowed even if there are some data loss in video data or audio data. Here, a packet which is transferred with a delay and cannot be reproduced or a packet in which an error occurs is simply deleted in the receiver. In other words, there is an issue, when a packet loss or an error occurs, the receiver cannot reproduce as maintaining the quality even if a high-quality data distribution process is being processed.

A solution for the issue in a data transferring according to the RTP can be a method for transmitting a retransmission request and a retransmission packet by TCP (Transmission Control Protocol). The TCP is effective for errors and is a reliable protocol regarding data transferring since retransmission is performed. However, the TCP is not effective for real-time communication since a retransmitted packet may be miss the time of reproduction of the packet.

Further, as an error correction method for a packet error or the like, an FEC (Forward Error Correction) has been considered for example. The FEC is a method in which an FEC packet for error correction is transmitted as a redundant packet and, when an error has occurred, the receiver recovers the lost packet due to the error according to the FEC packet.

However, the FEC has an issue that the throughput lowers since redundant packets are added. Further, it is difficult to determine an optimal additional capacity of FEC packets corresponding to the network conditions and there is an issue that an overhead of processing time has to be constantly considered.

In view of the above issue, as a possible method, there is an ARQ (Automatic Repeat Request). In the ARQ method, a receiver checks a sequence number of an RTP packet and, when a sequence number is missed, the receiver transmits a retransmission request of a packet of the missed sequence number to the transmitter. Then, since the transmitter retransmits the requested packet, a packet loss due to an error can be recovered.

As described above, the two methods (ARQ, FEC) are technologies that specify how to recover a packet loss. On the other hand, as a technology for preventing a packet loss from occurring, there is a rate control. In the rate control, for example, there is a control in which a network condition is detected from an arrived packet and, when the network is congested, the rate is controlled to reduce a possibility of a packet loss.

However, in ad-hoc communication, communication path conditions sometimes keep changing according to the distance between two radio communication devices on the transmitting side and receiving side. Thus, even when a control by an FEC using a fixed algorithm is performed for example, there has been an issue that it is difficult to be correspondent to changes in communication path conditions.

Thus, using the above issues as one view, it has been achieved to create a radio communication device 21 according to the second embodiment of the present invention. In the radio communication device 21 according to the second embodiment, it is possible to dynamically change the control by the FEC according to communication path conditions. Hereinafter, the radio communication device 21 will be described with reference to FIGS. 16 to 21.

[3-2] Functions of Radio Communication Device According to Second Embodiment

Figure 16:
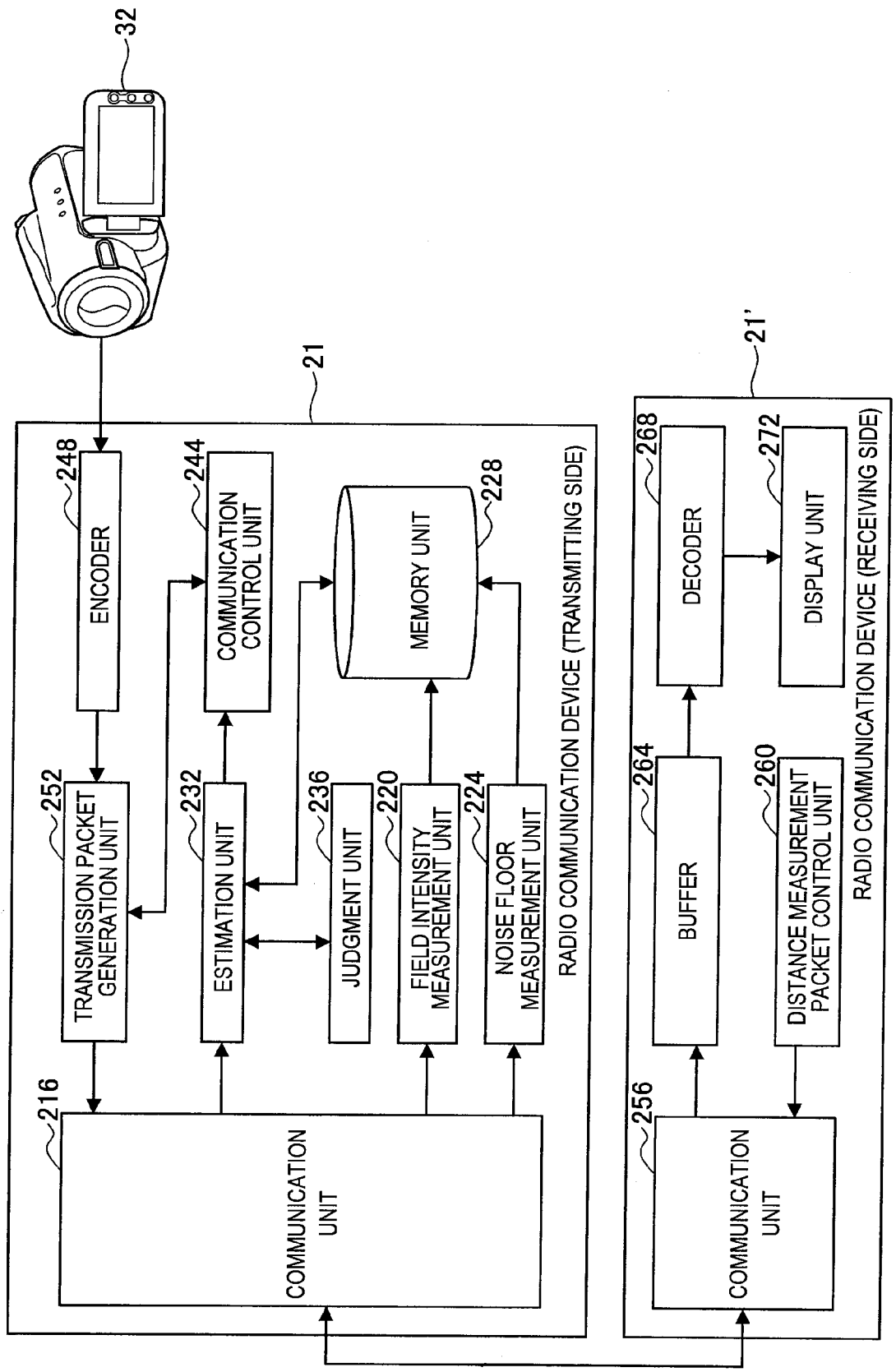
FIG. 16 is an explanatory view showing a configuration of a radio communication device according to a second embodiment of the present invention.

FIG. 16 is an explanatory view showing configurations of radio communication devices 21 and 21' according to the second embodiment of the present invention. As shown in FIG. 16, the radio communication device 21 on the transmitting side includes a communication unit 216, a field intensity measurement unit 220, a noise floor measurement unit 224, a memory unit 228, an estimation unit 232, a judgment unit 236, a communication control unit 244, an encoder 248 and a transmission packet generation unit 252. Further, the radio communication device 21' on the receiving side includes a communication unit 256, a distance measurement packet control unit 260, a buffer 264, a decoder 268 and a display unit 272. Here, since the communication unit 216, field intensity measurement unit 220, noise floor measurement unit 224, memory unit 228, estimation unit 232 and judgment unit 236 are described in "[2-2] Functions of radio communication device according to first embodiment," the following explanation will focus on the configurations different from the first embodiment.

The communication unit 256 of the radio communication device 21' on the receiving side is an interface that transmits/receives radio signals such as a distance measurement packet and streaming data to/from other radio communication devices 20' and has functions as a transmission unit and a reception unit.

The distance measurement packet control unit 260 controls transmission, from the communication unit 256 of the distance measurement packet, which is described in "[2-2] Functions radio communication device according to first embodiment." For example, the distance measurement packet control unit 260 controls so that the distance measurement packets is transmitted from the communication unit 256 periodically (every 30 ms, for example).

The buffer 264 temporarily maintains streaming data received by the communication unit 256 as a packet from the radio communication device 21. Then, when a unit of packets, which has any meaning (for example, one frame in case of a video) is maintained in the buffer 264, the packets are supplied to the decoder 268. In other words, the buffer 264 functions as a depacketizer.

The decoder 268 decodes the packets supplied from the buffer 264 and outputs to the display unit 272. The display unit 272 displays videos based on the packets supplied from the decoder 268. For example, the display unit 272 may be a CRT (Cathode Ray Tube) display device, a liquid crystal display (LCD) device or an OLED (Organic Light Emitting Display). Here, when the packet supplied from the buffer 264 is audio data, the decoder 268 may decode the audio data supplied from the buffer 264 and output to an audio output device such as an earphone, a speaker and a headphone.

Further, the decoder 268 recovers the original data packet which is lost during radio communication by using a later described redundant packet among the packets supplied from the buffer 264. Here, an illustrative example in which a lost original data packet is recovered will be described with reference to FIG. 17.

Figure 17:
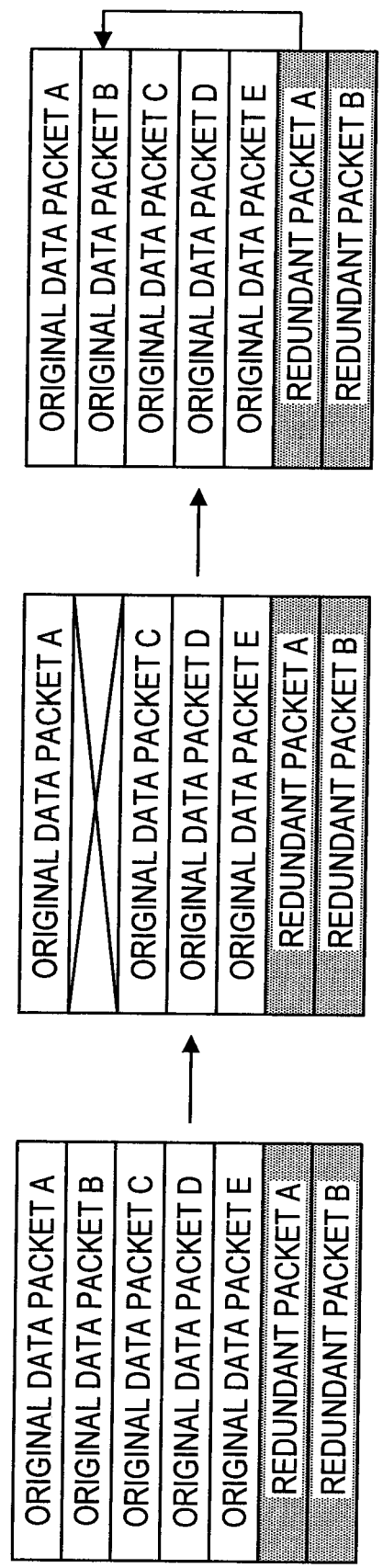
FIG. 17 is an explanatory view showing a manner how a lost original data packet is recovered.

FIG. 17 is an explanatory view showing a manner how a lost original data packet is recovered. As shown in the left diagram in FIG. 17, it is assumed that the radio communication device 21 adds redundant packets A and B to original data packets A to E and transmits the packets. Here, the redundant packets are created by, for example, exclusive or (EXOR) of original data packet.

Then, as shown in the middle diagram in FIG. 17, it is assumed that the original data packet B is lost during radio communication. In this case, as shown in the right diagram in FIG. 17, the decoder 268 of the radio communication device 21' can recover the original data packet B using the redundant packet A. Here, the decoder 268 can recover original data packets as many as the number of the redundant packets.

The encoder 248 of the radio communication device 21 on the transmitting side has a function as a compression unit for capturing and encoding one frame of video data (original data, transmission data) taken by an imaging device 32 and supplying to the transmission packet generation unit 252.

Here, as a data format after encoded by the encoder 248, there is an image compression format such as JPEG (Joint Photographic coding Experts Group), JPEG2000, Motion JPEG, AVC (Advanced Video Coding), MPEG (Moving Picture Experts Group) 1, MPEG2 and MPEG4, or an audio compression format such as MP3 (MPEG1 Audio Layer-3), AAC (Advanced Audio Coding), LPCM (Linear PCM), WMA9 (Windows (registered trademark) Media Audio9), ATRAC (Adaptive TRansform Acoustic Coding) and ATRAC3.

The transmission packet generation unit 252 packetizes the encoded data supplied from the encoder 248 and supplies the packet to the communication unit 216. The packet created by the transmission packet generation unit 252 is converted into an electrical signal in the communication unit 216 and transmitted to the radio communication device 21' on the receiving side.

Further, the transmission packet generation unit 252 according to the present embodiment has a function as a data processing unit for packetizing the original data and generating a redundant packet (error correction data) to be added to the original data packet. Here, the packet amount of the redundant packet created by the transmission packet generation unit 252 with respect to the original data packet is controlled by the communication control unit 244.

The communication control unit 244 has a function as a control unit for controlling the packet amount of the redundant packet created by the transmission packet generation unit 252 with respect to the original data packet based on the distance from the radio communication device 21' estimated by the estimation unit 232 in use of the distance estimation method described in "[2-2] Functions of radio communication device according to first embodiment."

For example, the communication control unit 244 may increase the packet amount of the redundant packet created by the transmission packet generation unit 252 with respect to the original data packet as the longer distance from the radio communication device 21' is estimated by the estimation unit 232. Note that a longer distance between the radio communication device 21 and the radio communication device 21' results in a worse reliability of communication. On the other hand, the greater number of redundant packets transmitted from the radio communication device 21 results in the greater number of original data packets which can be recovered. Thus, as described above, the communication control unit 244 increases the packet amount of the redundant packet created by the transmission packet generation unit 252 with respect to the original data packet when a longer distance between the radio communication device 21 and radio communication device 21' is estimated, and this can prevent a deterioration of reliability of communication.

More specifically, the communication control unit 244 may designate the number of redundant packet to be "1" when estimation unit 232 estimates that the distance from the radio communication device 21' is a short distance, may specify the number to be "5" when a medium distance is estimated, and may specify the number to be "10" when a long distance is estimated.

Hereinafter, an illustrative example in which the number of added redundant packet is varied by a control of the communication control unit 244 will be described with reference to FIG. 18.

Figure 18:
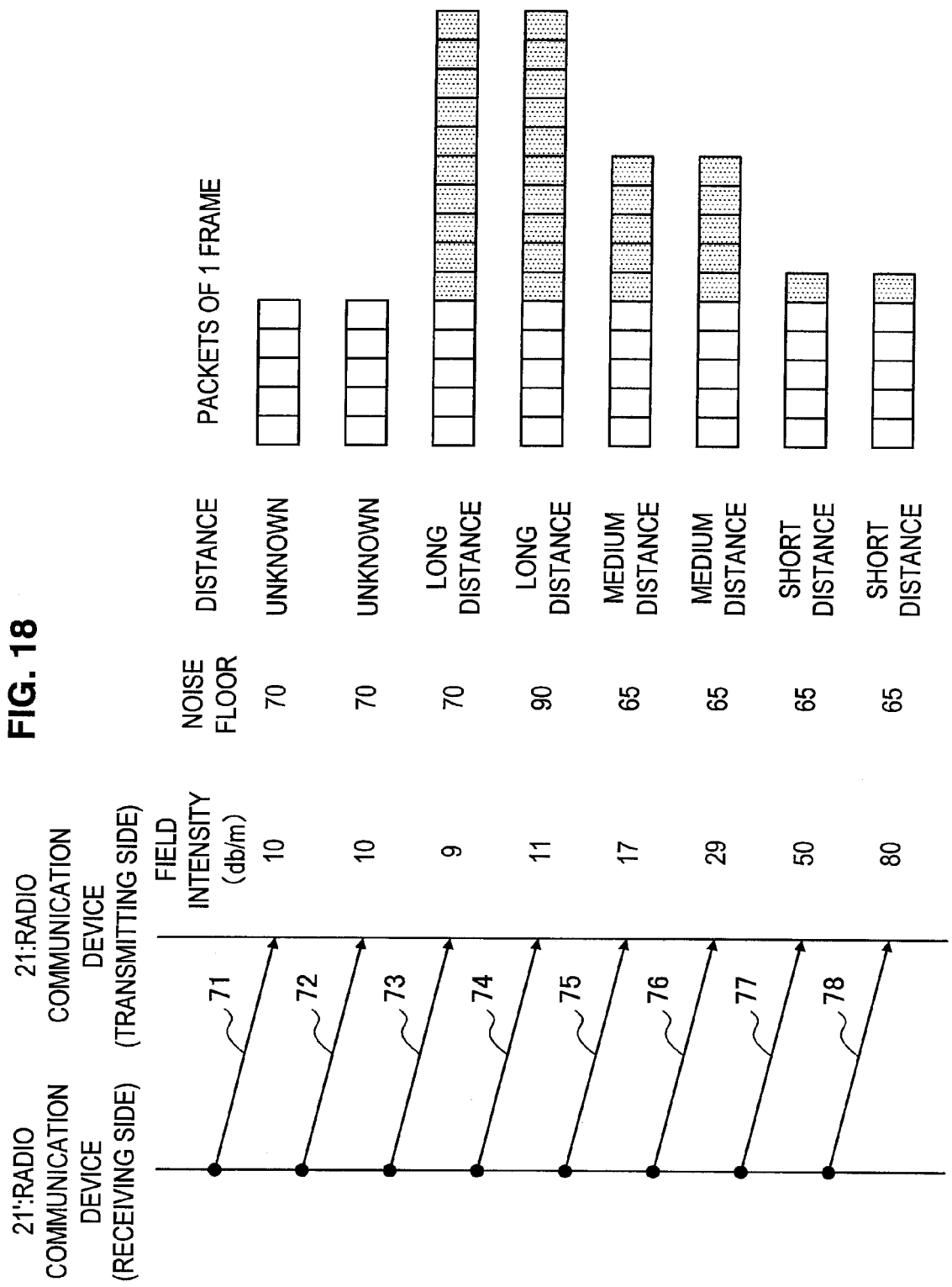
FIG. 18 is an explanatory view showing a relationship between an estimation result of an estimation unit and the number of packets of data to be transmitted.

FIG. 18 is an explanatory view showing a relationship between the estimation result of the estimation unit 232 and the number of packets of data to be transmitted. In FIG. 18, similarly to FIG. 11, the requirement A is assumed that three or more pairs of the field intensity and noise floor value are accumulated in the distance measurement database and the lower limit set value used by the judgment unit 236 for filtering is set to 50 and the upper limit set value is set to 70. The estimation unit 232 calculates a distance measurement evaluation value by averaging last three field intensities and it is assumed that threshold value F=10 and threshold value N=30.

As shown in FIG. 18, the radio communication device 21 firstly receives a distance measurement packet 71. Then, the radio communication device 21 measures the field intensity of the distance measurement packet 71 as 10 db/m and measures the noise floor as 70. The noise floor of the distance measurement packet 71 satisfies the certain requirement of the judgment unit 236, the pair of the field intensity and noise floor of the distance measurement packet 71 is maintained as the distance measurement database in the estimation unit 232. However, since the number of the pairs of the field intensity and noise floor maintained as the distance measurement database in the estimation unit 232 does not reach three, the estimation unit 232 concludes that the requirement A is not satisfied and the distance from the radio communication device 21' is unknown.

As described above, when the estimation unit 232 estimates that the distance is unknown, the communication control unit 244 specifies "0" to the transmission packet generation unit 252, for example. Thus, the transmission packet generation unit 252 packetizes the encoded original data and only the original data packet packetized by the transmission packet generation unit 252 is transmitted from the radio communication device 21. Here, in FIG. 18, original data packets are shown by white rectangles and redundant packets are shown by colored rectangles.

Then, the radio communication device 21 receives a distance measurement packet 72. After that, the radio communication device 21 measures the field intensity of the distance measurement packet 72 as 10 db/m and measures the noise floor as 70. Since the noise floor of the distance measurement packet 72 satisfies the certain requirement of the judgment unit 236, the pair of the field intensity and noise floor of the distance measurement packet 72 is maintained as the distance measurement database in the estimation unit 232. However, since the number of the pairs of the field intensity and noise floor maintained as the distance measurement database in the estimation unit 232 does not reach three, the estimation unit 232 concludes that the requirement A is not satisfied and the distance from the radio communication device 21' is unknown. Thus, similarly to the case where the distance measurement packet 71 is received, the communication control unit 244 specifies "0 unit" to the transmission packet generation unit 252 and only an original data packet packetized by the transmission packet generation unit 252 is transmitted from the radio communication device 21.

After that, the radio communication device 21 receives a distance measurement packet 73. Then, the radio communication device 21 measures the field intensity of the distance measurement packet 73 as 9 db/m and measures the noise floor as 70. Since the noise floor of the distance measurement packet 73 satisfies the certain requirement of the judgment unit 236, the pair of the field intensity and noise floor of the distance measurement packet 73 is maintained as the distance measurement database in the estimation unit 232. Further, since the number of the pairs of the field intensity and noise floor maintained as the distance measurement database in the estimation unit 232 reaches three, the estimation unit 232 calculates a distance measurement evaluation value as (10+10+9)/3=9.666 . . . . Since the distance measurement evaluation value is smaller than the threshold value F, the estimation unit 232 estimates that the distance from the radio communication device 21' is a long distance.

As described above, when the estimation unit 232 estimates that the distance is a long distance, the communication control unit 244 specifies "10" to the transmission packet generation unit 252 for example. Thus, the transmission packet generation unit 252 creates ten redundant packets based on the original data packet and the communication unit 216 transmits the original data packet to which ten redundant packets are added. The number of redundant packets packetized by the transmission packet generation unit 252 in this manner is schematically shown as ten packets in FIG. 18.

Further, the radio communication device 21 receives a distance measurement packet 74. Then, the radio communication device 21 measures the field intensity of the distance measurement packet 74 as 11 db/m and measures the noise floor as 90. Since the noise floor of the distance measurement packet 74 does not satisfy the certain requirement of the judgment unit 236 (excesses the upper limit set value 70), the pair of the field intensity and noise floor of the distance measurement packet 74 is not used by the estimation unit 232. However, since the number of the pairs of the field intensity and noise floor maintained as the distance measurement database in the estimation unit 232 reaches three, the estimation unit 232 calculates a distance measurement evaluation value as (10+10+9)/3=9.666 . . . . Since the distance measurement evaluation value is smaller than the threshold value F, the estimation unit 232 estimates that the distance from the radio communication device 21' is a long distance.

Thus, similarly to the case where the distance measurement packet 73 is received, the communication control unit 244 specifies "10" to the transmission packet generation unit 252, the transmission packet generation unit 252 generates ten redundant packets based on the original data packet, and the communication unit 216 transmits the original data packet to which ten redundant packets are added.

Next, the radio communication device 21 receives a distance measurement packet 75. Then, the radio communication device 21 measures the field intensity of the distance measurement packet 75 as 17 db/m and measures the noise floor as 65. Since the noise floor of the distance measurement packet 75 satisfies the certain requirement of the judgment unit 236, the pair of the field intensity and noise floor of the distance measurement packet 75 maintained as the distance measurement database in the estimation unit 232. Further, since the number of the pairs of the field intensity and noise floor maintained as the distance measurement database in the estimation unit 232 reaches three, the estimation unit 232 calculates a distance measurement evaluation value as (10+9+17)/3=12. Since the distance measurement evaluation value is greater than the threshold value F and smaller than the threshold value N, the estimation unit 232 estimates that the distance from the radio communication device 21 is a medium distance.

When the estimation unit 232 estimates that the distance is a medium distance in this manner, the communication control unit 244 specifies "5" to the transmission packet generation unit 252 for example. Thus, the transmission packet generation unit 252 generates five redundant packets based on the original data packet and the communication unit 216 transmits the original data packet to which five redundant packets are added. The number of redundant packets packetized by the transmission packet generation unit 252 in this manner is schematically shown as five packets in FIG. 18.

As detail explanation will be given later, when the distance measurement packets 76 to 78 are received, the estimation unit 232 operates in the same manner and can estimate that the distance from the radio communication device 21' is closer to be a short distance. When the estimation unit 232 estimates that the distance is a short distance, the communication control unit 244 specifies "1" to the transmission packet generation unit 252 for example. Thus, the transmission packet generation unit 252 generates a redundant packet based on the original data packet and the communication unit 216 transmits the original data packet to which the redundant packet is added. The number of the redundant packets packetized by the transmission packet generation unit 252 in this manner is schematically shown as one packet in FIG. 18.

Note that, in view of the clarity of the explanation, it has been described that the transmission timing of packetized data and the reception timing of the distance measurement packet are synchronized; however, the reception timing of the distance measurement packet and the transmission timing of packetized data by the radio communication device 21 can be asynchronous.

When the redundant packet amount is changed according to the distance between the radio communication device 21 and the radio communication device 21' as described above, generally robust streaming data can be supplied to the radio communication device 21' without spreading useless data to the network.

[3-3] Operation of Radio Communication Device According to Second Embodiment

The functions of the radio communication devices 21 and 21' according to the second embodiment have been described with reference to FIGS. 16 to 18. Next, an operation of the radio communication devices 21 and 21' according to the second embodiment will be described with reference to FIGS. 19 to 21.

Figure 19:
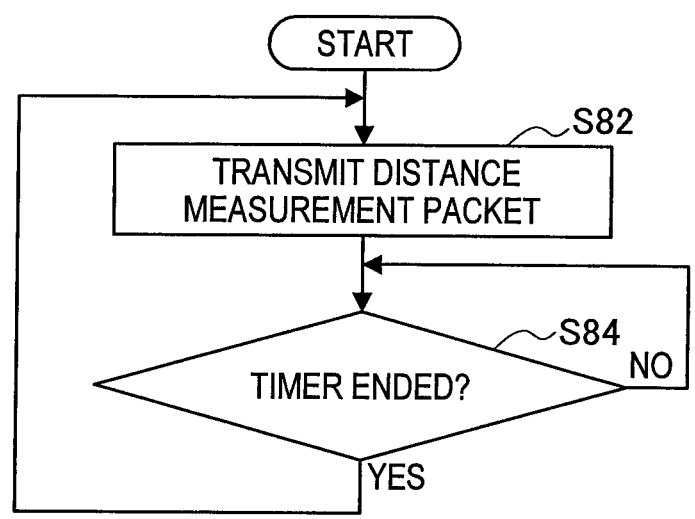
FIG. 19 is a flowchart showing a flow of a distance measurement packet transmission by a radio communication device on receiving side.

FIG. 19 is a flowchart showing a transmission of the distance measurement packet by the radio communication device 21' on the receiving side. As shown in FIG. 19, the distance measurement packet control unit 260 of the radio communication device 21' generates a distance measurement packet and controls the communication unit 256 to transmit the distance measurement packet (S82). Then, the distance measurement packet control unit 260 judges whether the count of a timer in which a predetermined initial value is set becomes 0 and the timer has ended (S84).

When it is determined that the timer has ended, the distance measurement packet control unit 260 returns to the process in step S82 to control the communication unit 256 to transmit the distance measurement packet. By such a control of the distance measurement packet control unit 260, distance measurement packets are periodically transmitted from the radio communication device 21'. Here, the distance measurement packet may be in a format according to IEEE 802.11b or may have a data amount equal to or greater than 1 byte.

Figure 20:
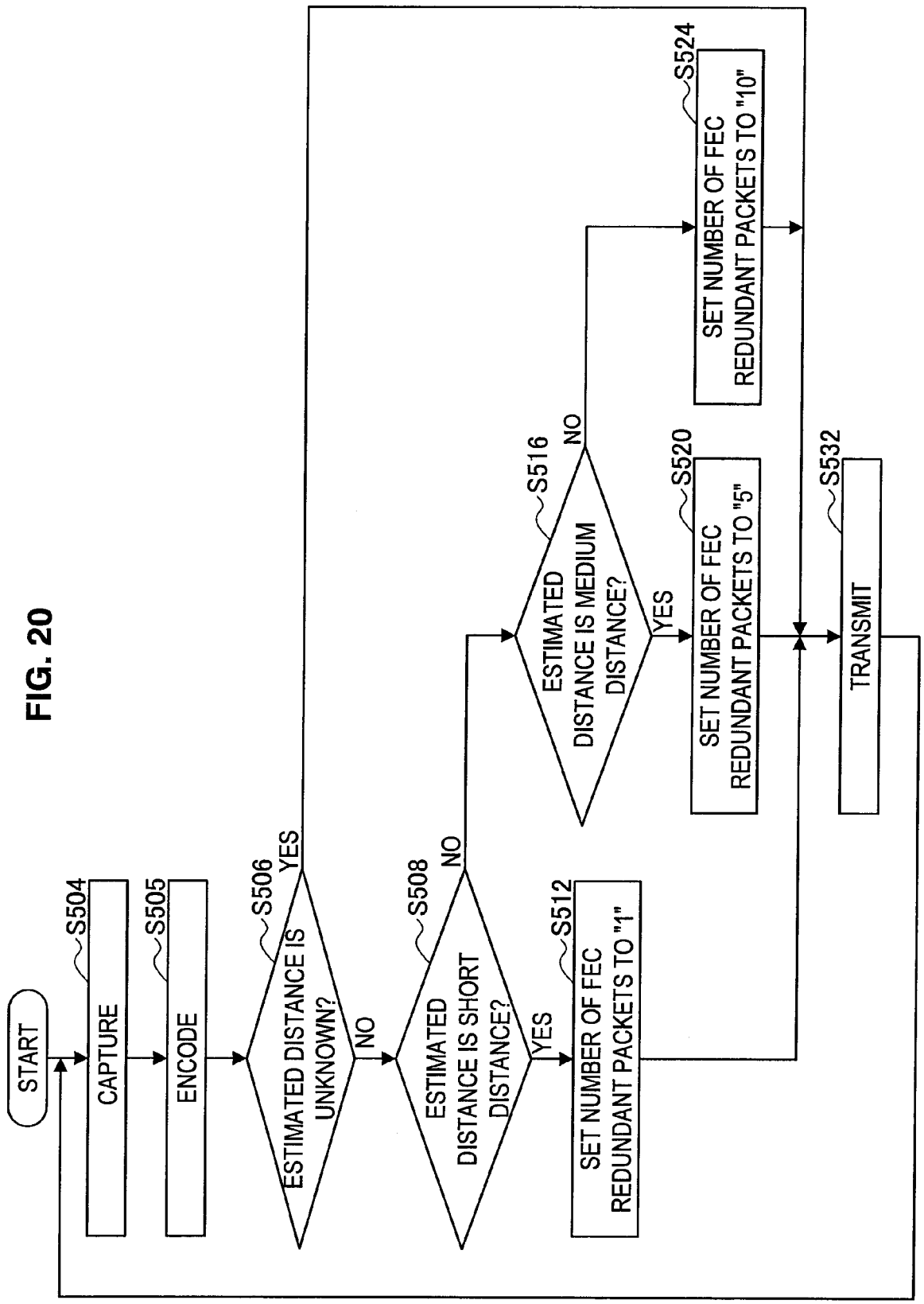
FIG. 20 is a flowchart showing an operation flow of a radio communication device on transmitting side.

FIG. 20 is a flowchart showing an operation of the radio communication device 21 on the transmitting side. As shown in FIG. 20, the encoder 248 of the radio communication device 21 captures one frame of video data from the imaging device 32 (S504). Then, the encoder 248 encodes the captured video data (S505).

Then, when the distance from the radio communication device 21' is estimated by the estimation unit 232 (S506) and the distance is estimated as a short distance (S508), the communication control unit 244 sets the number of FEC redundant packets to "1" (S512). On the other hand, when the estimation unit 232 estimates that the distance from the radio communication device 21' is not a short distance but a medium distance (S516), the communication control unit 244 sets the number of FEC redundant packets to "5" (S520). Further, when the estimation unit 232 estimates that the distance from the radio communication device 21' is neither a short distance nor a medium distance (S516), the communication control unit 244 sets the number of FEC redundant packets to "10" (S524).

After that, the transmission packet generation unit 252 generates redundant packets as many as the number set by the communication control unit 244 and adds to an original data packet, and the communication unit 216 transmits the original data packet to which the redundant packets are added to the radio communication device 21' (S532). Here, when it is determined that the estimated distance is unknown in S506, the communication unit 216 may transmit an original data packet to which no redundant packet is added.

Figure 21:
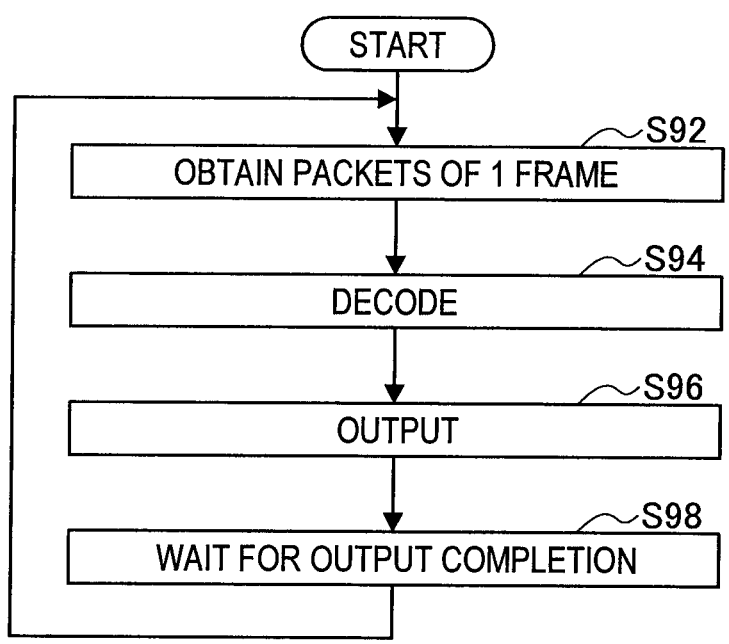
FIG. 21 is a flowchart showing a flow of decoding by the radio communication device on receiving side.

FIG. 21 is a flowchart showing a flow of decoding by the radio communication device 21' on the receiving side. As shown in FIG. 21, the decoder 268 of the radio communication device 21' obtains one frame of packets from the packets, which are received by the communication unit 256 and maintained in the buffer 264 (S92). Then, the decoder 268 decodes the obtained packet (S94). Here, when an original data packet is lost, the decoder 268 recovers the original data packet based on the added redundant packet. Then, the decoder 268 outputs the recovered packets to the display unit 272 for example (S96). After that, when the output to the display unit 272 is finished (waiting for VSYNC), the decoder 268 returns to the process in S92.

[4] Radio Communication Device According to Third Embodiment

As described above referring to FIGS. 16 to 21, according to the second embodiment of the present invention, since the radio communication device 21 controls the number of redundant packets to be added according to the distance from the radio communication device 21', a Qos control corresponding to the conditions can be realized. A third embodiment of the present invention that is described below also realizes a Qos control corresponding to the conditions, similarly to the second embodiment; however, the method for realizing the Qos control is different from that of the second embodiment. In short, in the third embodiment of the present invention, the Qos control is realized by controlling the number of retransmission request packets according to the distance. Hereinafter, such a third embodiment of the present invention will be described in detail with reference to FIGS. 22 to 28.

[4-1] Functions of Radio Communication Device According to Third Embodiment

Figure 22:
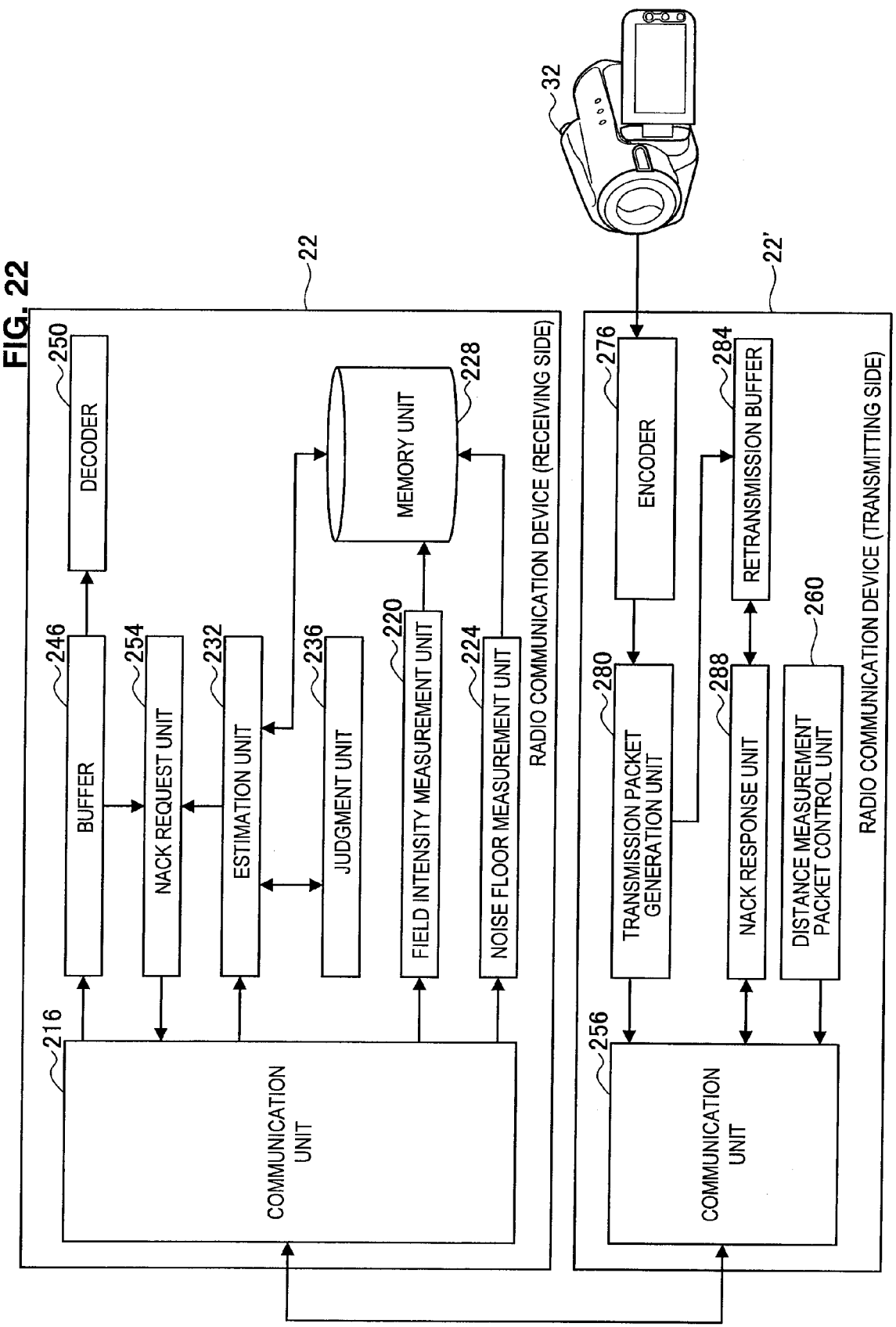
FIG. 22 is a functional block diagram showing a configuration of a radio communication device according to a third embodiment.

FIG. 22 is a functional block diagram showing configurations of radio communication devices 22 and 22' according to the third embodiment. As shown in FIG. 22, the radio communication device 22 on the receiving side includes a communication unit 216, a field intensity measurement unit 220, a noise floor measurement unit 224, a memory unit 228, an estimation unit 232, a judgment unit 236, a buffer 246, a decoder 250 and an NACK (Negative Acknowledgment) request unit 254.

Further, the radio communication device 22' on the transmitting side includes a communication unit 256, a distance measurement packet control unit 260, an encoder 276, a transmission packet generation unit 280, a retransmission buffer 284 and an NACK response unit 288. Here, since the communication unit 216, field intensity measurement unit 220, noise floor measurement unit 224, memory unit 228, estimation unit 232, judgment unit 236, communication unit 256 and distance measurement packet control unit 260 have been described in "[2-2] Functions of radio communication device according to first embodiment" or "[3-2] Functions of radio communication device according to second embodiment," the following explanation will focus on the configurations different from the first embodiment or the second embodiment.

The encoder 276 of the radio communication device 22' on the transmitting side captures and encodes one frame of video data taken by the imaging device 32 and supplies to the transmission packet generation unit 280.

The transmission packet generation unit 280 packetizes the encoded data supplied from the encoder 276 and supplies to the communication unit 256. The packet generated by the transmission packet generation unit 280 is converted to an electrical signal in the communication unit 256 and transmitted to the radio communication device 21 on the receiving side. Here, the transmission packet generation unit 280 generates, for example, an RTP packet 44 shown in FIG. 23 based on the encoded data.

Figure 23:
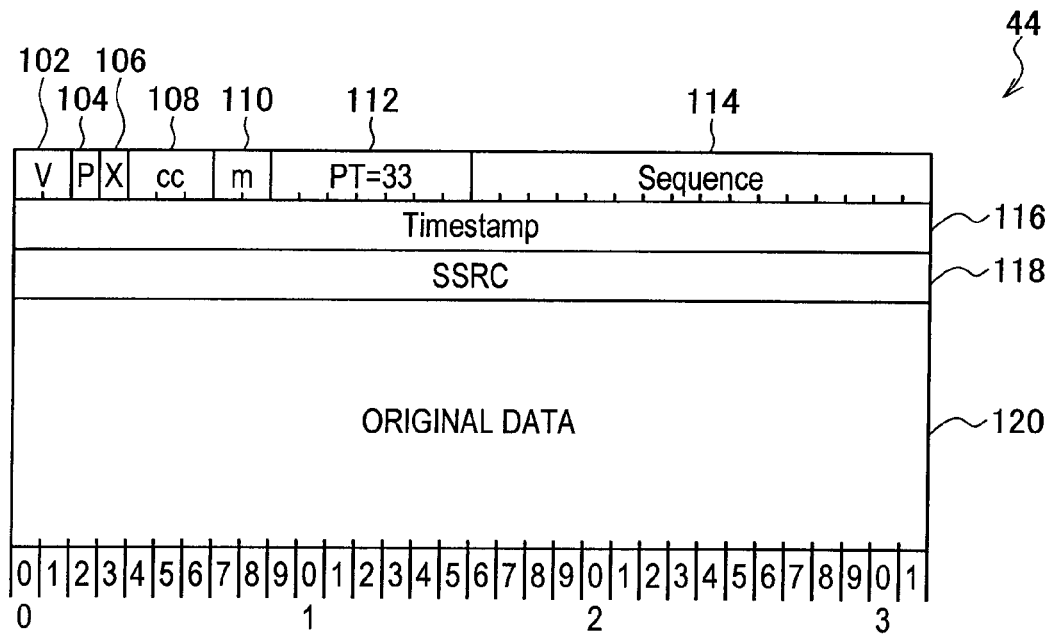
FIG. 23 is an explanatory view showing an example of a format of an RTP packet.

FIG. 23 is an explanatory view showing an example of a format of the RTP packet 44. As described in FIG. 23, the RTP packet 44 includes a version information (V) 102, padding (P) 104, existence/absence of extension header (X) 106, number of transmission source (cc: Counter) 108, marker information (M: marker bit), payload type (PT: Payload Type) 112, sequence number (Sequence) 114, time stamp (Timestamp) 116, synchronization source (transmission source) identifier (S SRC) 118 and original data 120 such as video data. In the payload type 112, "33" indicating that the packet is an RTP packet is written.

Based on such an RTP packet, the radio communication device 22 on the receiving side controls processing time by referring to the time stamp 116 so that a reproduction control of real-time images and sound can be realized.

Further, the RTP packet generated by the transmission packet generation unit 280 is recorded in the retransmission buffer 284. Similarly to the memory unit 228, the retransmission buffer 284 may be a memory medium of a nonvolatile memory such as an EEPROM and an EPROM, a magnetic disc such as a hard disk and a magnetic substance disk, an optical disc such as a CD-R/RW, a DVD-R/RW/+R/+RW/RAM and a BD (Blu-Ray Disc (registered trademark))-R/BD-RE, or an MO disc.

The NACK response unit 288 searches, from the retransmission buffer 284, an RTP packet including the sequence number that is written in a retransmission request packet received from the radio communication device 22 and controls the communication unit 256 to retransmit the searched RTP packet. Here, the details of the retransmission request packet will be described later with reference to FIG. 24.

The buffer 246 of the radio communication device 22 on the receiving side temporally stores the RTP packet received by the communication unit 216 from the radio communication device 22'. Then, when a unit of packets that has any meaning (one frame in case of video, for example) is stored in the buffer 246, the RTP packet is supplied to the decoder 250. In other words, the buffer 246 has a function as a depacketizer.

The decoder 250 decodes and outputs the packet supplied from the buffer 246. Here, when the packet supplied from the buffer 246 is audio data, the decoder 250 may decode the audio data supplied from the buffer 246 and output to an audio output device such as an earphone, a speaker and a headphone.

The NACK request unit 254 refers to the buffer 246 and detects a packet loss. Specifically, the NACK request unit 254 refers to a sequence number of the newly received RTP packet and detects a packet loss when the sequence number is not a number that is, "1" is added to the sequence number of the previously received RTP packet.

For example, when an RTP packet including a sequence number 3 is received after a reception of an RTP packet including a sequence number 1, the NACK request unit 254 detects a loss of an RTP packet including a sequence number 2.

However, as details are described below, the lost RTP packet is retransmitted using a function of the NACK request unit 254, and, as a result, RTP packets may be received in order of sequence numbers 1, 2, 3, 4, 5, 7, 6 and 8, for example. In this case, according to the above method, since the RTP packet including the sequence number 8 is received subsequent to the RTP packet including the sequence number 6, a loss of the RTP packet of the sequence number 7 may be detected. Then, the NACK request unit 254 maintains the largest sequence number among the sequence numbers of previously received RTP packets and a packet loss may be detected when the sequence number, that is, "1" is added to the largest sequence number is not received.

Further, when a packet loss is detected, the NACK request unit 254 generates a retransmission request packet for requesting retransmission of the lost packet and transmits to the radio communication device 22'. Here, a format of the retransmission request packet will be described with reference to FIG. 24.

Figure 24:
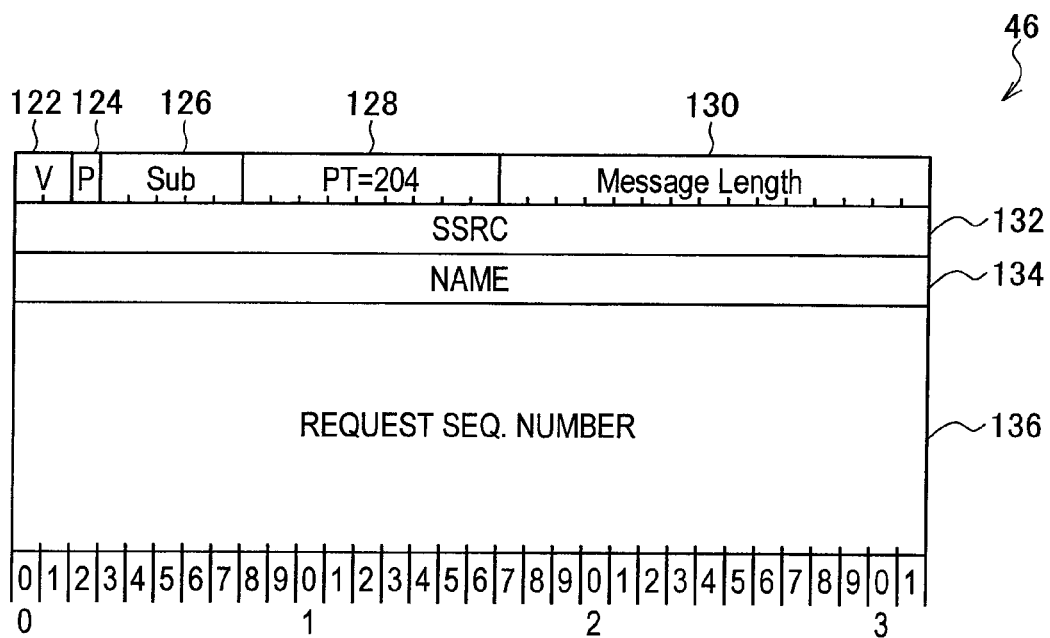
FIG. 24 is an explanatory view showing an example of a format of a retransmission request packet.

FIG. 24 is an explanatory view showing an example of a format of the retransmission request packet 46. As shown in FIG. 24, the retransmission request packet 46 includes, version information (V) 122, padding (P) 124, subtype (Sub)

126, payload type (PT) 128, message length (Message Length) 130, synchronization source (transmission source) identifier (SSRC) 132, name of application (NAME) 134 and request sequence number (request seq number) 136. In the payload type 128, "204" that indicates the packet is a retransmission request packet is written. In the request sequence number 136, a sequence number of a retransmission-requested RTP packet is written.

Further, the NACK request unit 254 has a function as a control unit for controlling the communication unit 216 to transmit generated retransmission request packets as many as the number of packets corresponding to the distance from the radio communication device 22', which is estimated by the estimation unit 232.

For example, the NACK request unit 254 may increase the number (unit number) of retransmission request packets to be transmitted from the communication unit 216 as a longer distance is estimated by the radio communication device 22'. Here, a longer distance between the radio communication device 22 and the radio communication device 22' increases the possibility of occurrence of a packet loss. Further, a greater number of retransmission request packets increases the possibility that any of the retransmission request packets reaches to the radio communication device 22' and the possibility that the retransmission packet is normally received from the radio communication device 22'. Thus, as described above, when the number of the retransmission request packet is increased corresponding to a longer distance estimated between the radio communication device 22 and the radio communication device 22', a packet loss can surely be recovered.

As an example, when the estimation unit 232 estimates that the distance is a short distance, the NACK request unit 254 may control so that the communication unit 216 transmits a retransmission request packet once. Further, when the estimation unit 232 estimates that the distance is a medium distance, NACK request unit 254 may control so that the communication unit 216 transmits the retransmission request packet twice. Further, when the estimation unit 233 estimates that the distance is a long distance, the NACK request unit 254 may control so that the communication unit 216 transmits the retransmission request packet three times.

Hereinafter, the retransmission request packet transmitted by the function of the NACK request unit 254 will be described in detail with reference to FIG. 25.

Figure 25:
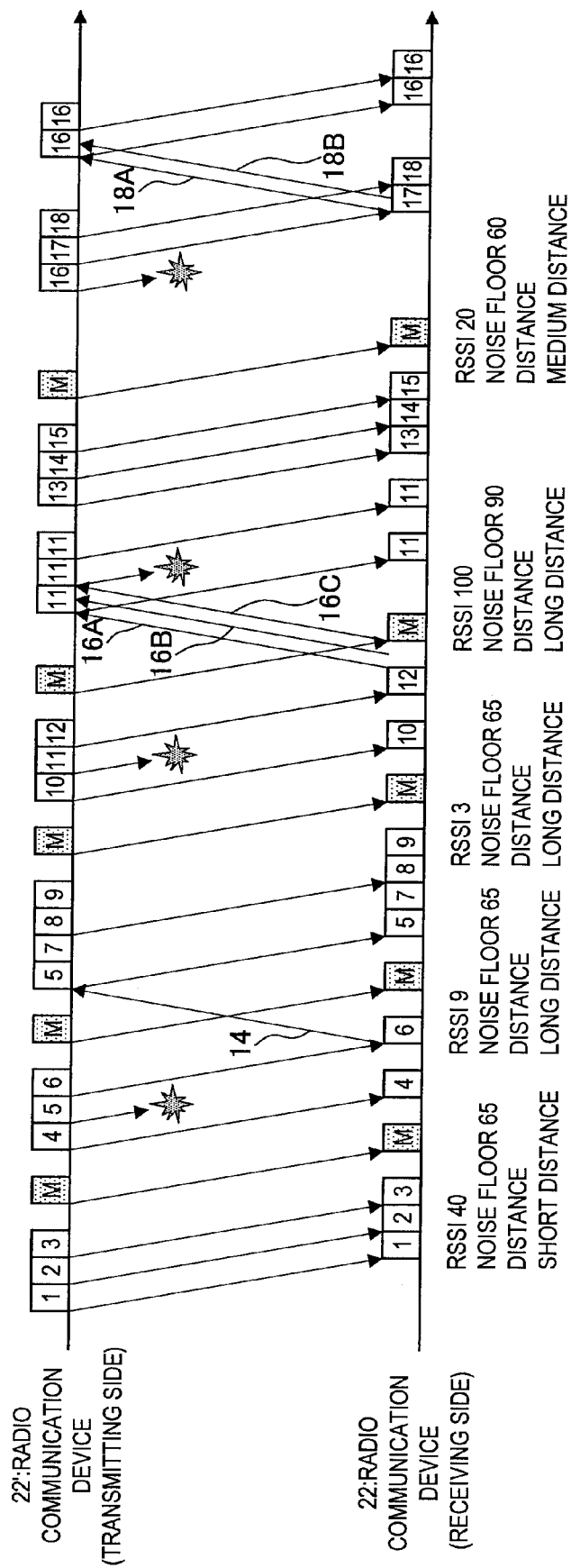
FIG. 25 is an explanatory view showing an illustrative example in which a retransmission request packet is transmitted by a function of NACK request unit.

FIG. 25 is an explanatory view showing an illustrative example in which a retransmission request packet is transmitted by the function of the NACK request unit 254. As shown in FIG. 25, the radio communication device 22' transmits the RTP packet and distance measurement packet to the radio communication device 22. Here, in FIG. 25, white rectangles represents RTP packets and the numbers in the white rectangles represent sequence numbers of RTP packets. Further, in FIG. 25, rectangles having "M" therein represent distance measurement packets.

Here, as shown in FIG. 25, it is assumed that RTP packets including sequence numbers 1 to 3, which are transmitted from the radio communication device 22' are received by the radio communication device 22 without any loss. Next, the radio communication device 22 receives a distance measurement packet and measures the field intensity of the distance measurement packet as 40 db/m and the noise floor as 65. Then, the estimation unit 232 estimates that the distance from the radio communication device 22' is a short distance.

Then, the radio communication device 22' transmits RTP packets including sequence numbers 4 to 6. However, as shown in FIG. 25, when the RTP packet including the sequence number 5 is lost, the radio communication device 22 detects that the loss of the RTP packet including the sequence number 5 and transmits a retransmission request packet 14 for requesting retransmission of the RTP packet including the sequence number 5. Here, since the estimation unit 232 estimates that the distance from the radio communication device 22' is a short distance, the radio communication device 22 transmits only one retransmission request packet 14.

Further, the radio communication device 22' transmits a distance measurement packet, and the radio communication device 22 measures the field intensity of the distance measurement packet as 9 db/m and the noise floor as 65. Then, the estimation unit 232 estimates that the distance from the radio communication device 22' is a long distance.

Further, upon receiving the retransmission request packet 14 from the radio communication device 22, the radio communication device 22' searches the RTP packet requested by the retransmission request packet 14 from the retransmission buffer 284 and retransmits the RTP packet, in which the sequence number is 5, from the communication unit 256.

Next, it is assumed that the radio communication device 22' transmits RTP packets including sequence numbers 7 to 9 and the RTP packets including the sequence numbers 7 to 9 are received by the radio communication device 22 without any loss. In this case, the radio communication device 22 receives the RTP packet including the sequence number 5 and subsequently the RTP packet having the sequence number 7; however, the largest sequence number maintained by the radio communication device 22 is "6." Thus, the loss of the RTP packet including the sequence number 6 is not detected.

Next, the radio communication device 22' transmits a distance measurement packet and the radio communication device 22 measures the field intensity of the distance measurement packet as 3 db/m and the noise floor as 65. Thus, the estimation unit 232 estimates that the distance from the radio communication device 22' is a long distance.

Next, it is assumed that the radio communication device 22' transmits RTP packets including sequence numbers 10 to 12 and the RTP packet including the sequence number 11 is lost as shown in FIG. 25. In this case, the radio communication device 22 detects the loss of the RTP packet including the sequence number 11 and transmits retransmission request packets 16A to 16C for requesting retransmission of the RTP packet including the sequence number 11. Here, the radio communication device 22 transmits the three retransmission request packets 16A to 16C because the estimation unit 232 estimates that the distance from the radio communication device 22' is a long distance.

Next, the radio communication device 22' transmits a distance measurement packet and the radio communication device 22 measures the field intensity of the distance measurement packet as 100 db/m and the noise floor as 90. Then, since noise floor value excesses the upper limit set value (70, for example), the estimation unit 232 does not consider the measurement and estimates that the distance from the radio communication device 22' is a long distance.

Further, upon receiving the retransmission request packets 16A to 16C from the radio communication device 22, the radio communication device 22' searches, in the retransmission buffer 284, the RTP packet requested by the retransmission request packets 16A to 16C and retransmits the RTP packet in which the sequence number is 11 via the communication unit 256. Here, since three retransmission request packets 16A to 16C are received from the radio communication device 22, the radio communication device 22' repeats the process of transmitting the RTP packet in which the sequence number is 11. Thus, as shown in FIG. 25, even when one of the RTP packets among the RTP packets in which the sequence number is 11 is lost, the radio communication device 22 can receive other RTP packet.

Next, it is assumed that the radio communication device 22' receives RTP packets including sequence numbers 13 to 15 and the RTP packets including the sequence numbers 13 to 15 are received by the radio communication device 22 without any loss. Further, the radio communication device 22' transmits a distance measurement packet and the radio communication device 22 measures the field intensity of the distance measurement packet as 20 db/m and the noise floor as 60. Then, the estimation unit 232 estimates that the distance from the radio communication device 22' is a medium distance.

Next, it is assumed that the radio communication device 22' transmits RTP packets including sequence numbers 16 to 18 and the RTP packet including the sequence number 16 is lost as shown in FIG. 25. In this case, the radio communication device 22 detects the loss of the RTP packet including the sequence number 16 and transmits retransmission request packets 18A and 18B for requesting retransmission of the RTP packet including the sequence number 16. Here, the radio communication device 22 transmits two retransmission request packets 18A and 18B because the estimation unit 232 estimates that the distance from the radio communication device 2T is a medium distance.

When the radio communication device 22 changes algorithm of the retransmission request according to the distance from the radio communication device 22' as described above, robust streaming data can be provided. Here, in FIG. 25, an example in which the radio communication device 22' transmits a distance measurement packet separately from the RTP packet including original data has been described; however, the radio communication device 22 may estimate the distance using the RTP packet including original data as a distance measurement packet.

[4-2] Operation of Radio Communication Device According to the Third Embodiment

Functions of the radio communication devices 22 and 22' according to the third embodiment have been described with reference to FIGS. 22 to 25. Next, an operation of the radio communication devices 22 and 22' according to the third embodiment will be described with reference to FIGS. 26 to 28. Here, a flow of a distance measurement packet transmission by the radio communication device 22' and a flow of decoding by the radio communication device 22 are substantially the same as the content described in "[3-3] Operation of radio communication device according to second embodiment," so those explanation will be omitted.

Figure 26:
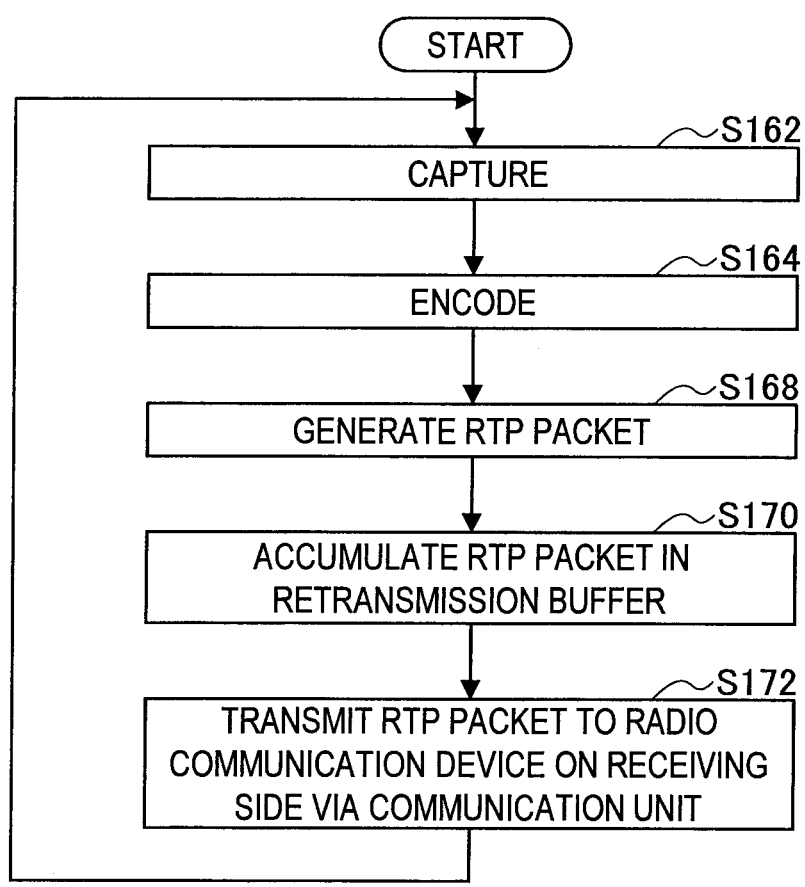
FIG. 26 is a flowchart showing a flow of an RTP packet transmission by a radio communication device on transmitting side.

FIG. 26 is a flowchart showing a flow that the radio communication device 22' on the transmitting side transmits an RTP packet. Firstly, the encoder 276 of the radio communication device 22' captures one frame of video data taken by the imaging device 32 as shown in FIG. 26 (S162). Then, the encoder 276 encodes the captured video data (S164).

Then, the transmission packet generation unit 280 generates an RTP packet based on the encoded data (S168), the generated RTP packet is stored in retransmission buffer 284 (S170). Then, the radio communication device 22' transmits the RTP packet to the radio communication device 22 via the communication unit 256 (S172).

Figure 27:
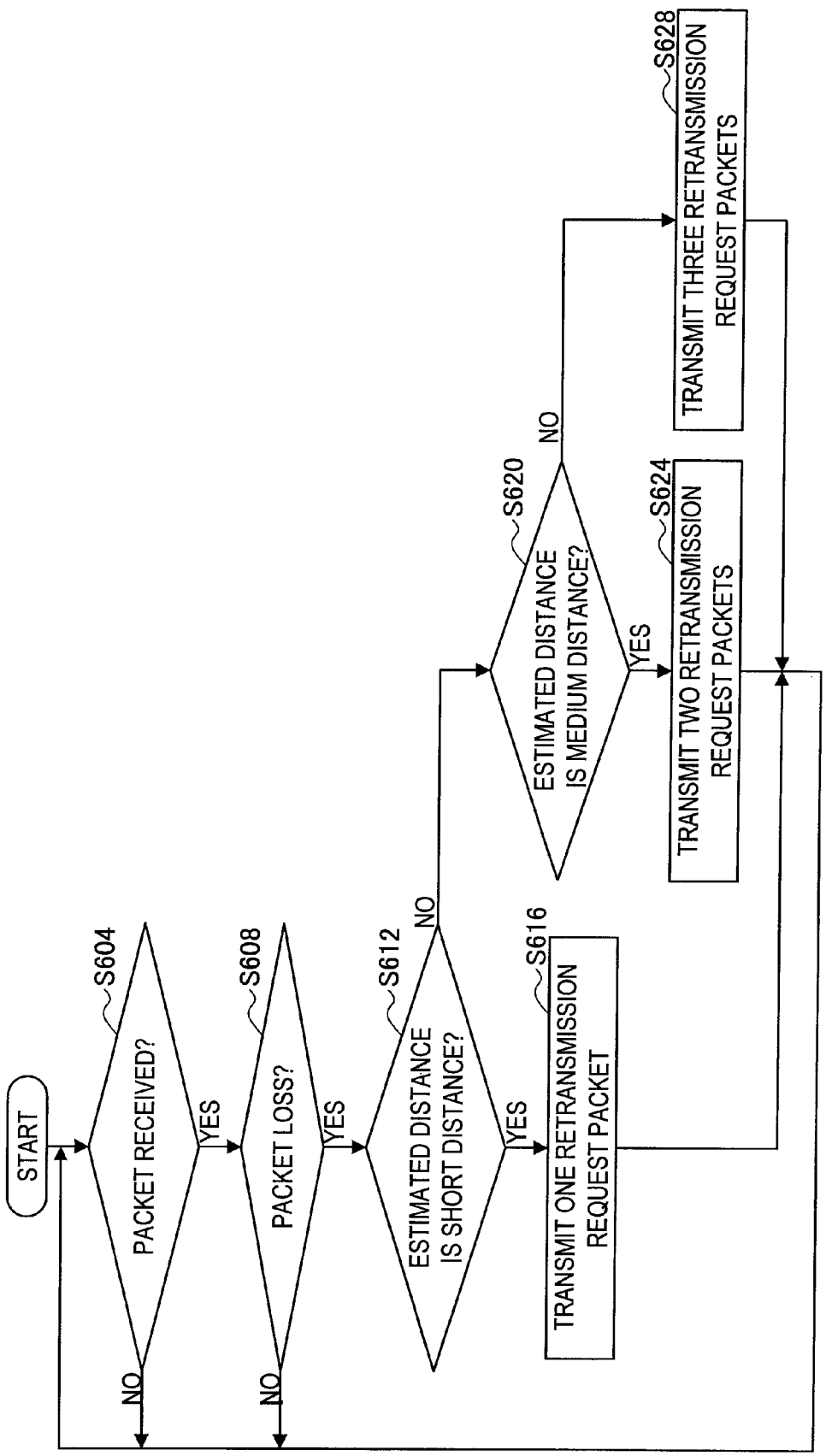
FIG. 27 is a flowchart showing an operation flow of a radio communication device on receiving side.

FIG. 27 is a flowchart showing an operation flow of the radio communication device 22 on the receiving side. Firstly, when the RTP packet is received (S604), the NACK request unit 254 of the radio communication device 22 judges whether there is an occurrence of a packet loss based on the sequence number written in the RTP packet (S608). Then, when it is determined that the distance from the radio communication device 22' is a short distance (S612), the NACK request unit 254 transmits one retransmission request packet (S616).

On the other hand, when it is assumed that the distance from the radio communication device 22' is a medium distance (S620), the NACK request unit 254 transmits two retransmission request packets (S624). Further, when it is assumed that the distance from the radio communication device 22' is neither a short distance nor a medium distance (S620), the NACK request unit 254 transmits three retransmission request packets (S628).

Figure 28:
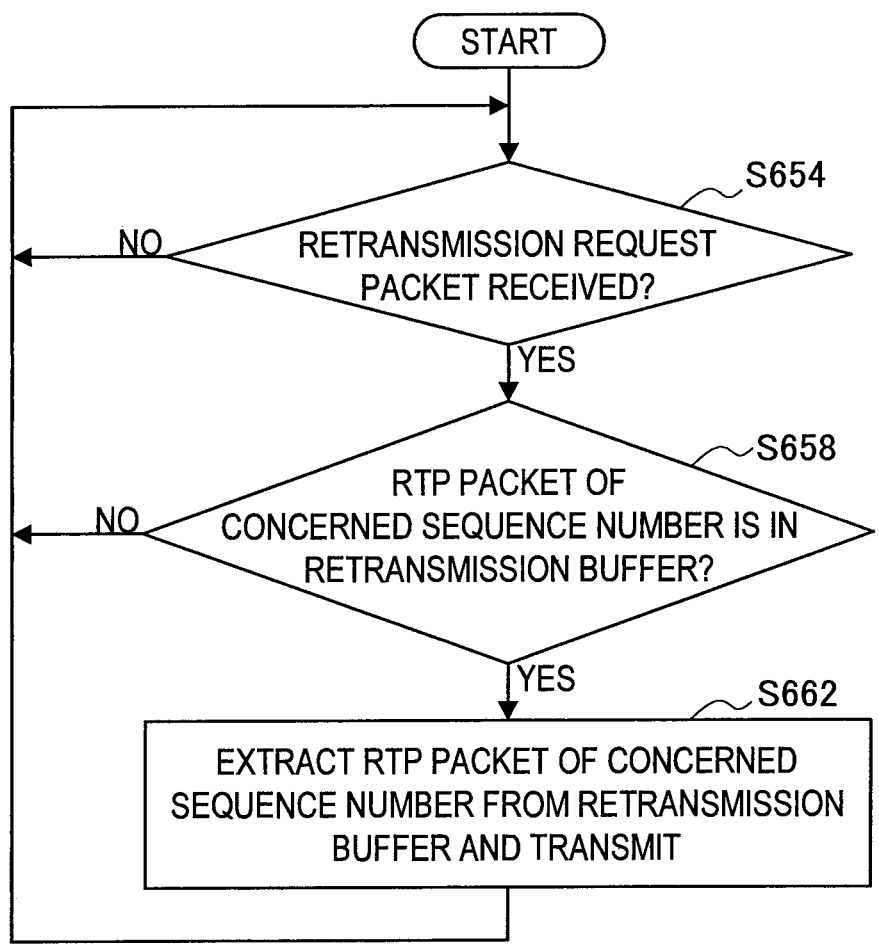
FIG. 28 is a flowchart showing a flow of an RTP packet retransmission by a radio communication device on transmitting side.

FIG. 28 is a flowchart showing a flow that the radio communication device 22' on the transmitting side retransmits an RTP packet. Firstly, when a retransmission request packet is received from the radio communication device 22 (S654), the NACK response unit 288 of the radio communication device 22' searches the RTP packet including the sequence number written in the retransmission request packet in the retransmission buffer 284 (S658). Then, the NACK response unit 288 of the radio communication device 2T transmits the RTP packet searched and extracted from the retransmission buffer 284 to the radio communication device 22 via the communication unit 256 (S662).

[5] Conclusion

As described above, according to the second embodiment of the present invention, the communication control unit 244 controls a data amount of a redundant packet to be added to the transmission packet generation unit 252 with respect to an original data packet according to the distance from the radio communication device 21' on the receiving side. For example, the communication control unit 244 increases the data amount of the redundant packet with respect to the original data packet as a longer distance from the radio communication device 21' on the receiving side is estimated. Thus, according to the second embodiment of the present invention, lost data can be recovered more certainly even when the distance from the radio communication device 21' on the receiving side is a long distance.

Further, according to the third embodiment of the present invention, the NACK request unit 254 controls the number of retransmission request packets to be transmitted by the communication unit 216 according to the distance from the radio communication device 22' on the transmitting side. For example, the NACK request unit 254 increases the number of retransmission request packets as a longer distance from the radio communication device 22' on the transmitting side is estimated. Thus, according to the third embodiment of the present invention, lost data can be recovered more certainly even when the distance from the radio communication device 22' on the transmitting side is a long distance.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, according to the first embodiment, an example in which the estimation unit 232 estimates the distance from the radio communication device 20' as a long distance, a medium distance or a short distance has been described; however, the present invention is not limited to this example. For example, the estimation unit 232 may estimate the distance from the radio communication device 20' by the meter (m).

Further, in the first embodiment, an example in which the judgment unit 236 performs filtering based on noise floors has been described; however, the present invention is not limited to this example. For example, the judgment unit 236 may perform filtering based on the size of noise component such as an S/N ratio of a distance measurement packet. Further, a radio communication device having the functions (FEC, ARQ) described in the second embodiment and third embodiment in combination is provided.

Further, the respective steps in the processes of the radio communication devices 20 to 22 and 20' to 22' in this specification are not needed to be processed in order described in the flowcharts. For example, the respective steps in the processes of the radio communication devices 20 to 22 and 20' to 22' may include processes that are executed in parallel or separately (parallel processes or a process by an object, for example).

Further, it is possible to create a computer program to control the hardware such as the CPU 201, ROM 202 and RAM 203 which are installed in the radio communication devices 20 to 22 and 20' to 22' to perform the same functions as the respective configurations of the radio communication devices 20 to 22, and 20' to 22'. Further, a memory medium storing the computer program can be provided. Further, when the respective functional blocks shown in the functional block diagrams in FIGS. 3, 16 and 22 are composed of hardware, the series of processes can be realized by the hardware.

The invention claimed is:

1. A radio communication device comprising:
   a control unit that controls to prepare for data loss during radio communication of transmission data; and
   a transmission unit that transmits the transmission data by radio to another radio communication device according to the control of the control unit,
   wherein one of the radio communication device and the other radio communication device comprises:
      a reception unit configured to receive a radio signal from the other ratio communication device;
      a measurement unit configured to measure a field intensity and an associated noise component from the received radio signal;
      a judgment unit configured to judge whether the noise component satisfies a certain requirement; and
      an estimation unit configured to estimate a distance between the radio communication device and the other radio communication device based on the field intensity whose corresponding noise component satisfies the certain requirement, and
   wherein the control unit performs a control of a content according to the estimated distance, and
   wherein the estimation unit:
      calculates an average value of a plurality of field intensities of the radio signals which are judged to satisfy the certain requirement by the judgment unit,
      judges whether the average value is included in any one of classified average value ranges, and
      estimates that the distance from the other radio communication device is a distance corresponding to the average value range to which the average value is included.

2. The radio communication device according to claim 1, further comprising:
   a data processing unit that adds error correction data to the transmission data,
   wherein the control unit controls a data amount of the error correction data, with respect to the transmission data, which is to be added by the data processing unit according to the estimated distance.

3. The radio communication device according to claim 2, wherein the control unit increases the data amount of the error correction data with respect to the transmission data when the estimated distance is a long distance.

4. The radio communication device according to claim 1, wherein the judgment unit judges that the noise component of the radio signal satisfies the certain requirement when the noise component is greater than a lower limit set value and lower than an upper limit set value.

5. The radio communication device according to claim 1, wherein:
   the reception unit receives device information, from the other radio communication device in advance, which indicates a transmitting power of the radio signal of the other radio communication device, and
   the estimation unit estimates the distance from the other radio communication device using the device information.

6. A radio communication device comprising:
   a control unit that controls to prepare for data loss during radio communication of transmission data;
   a reception unit that receives data transmitted by radio;
   a transmission unit that transmits the transmission data by radio to another radio communication device according to the control of the control unit,
   wherein one of the radio communication device and the other radio communication device estimates a distance from the other based on a field intensity of a radio signal which is judged to satisfy a certain requirement regarding noise component among radio signals received from the other of the radio communication device and the other radio communication device, and wherein the other of the radio communication device and the other radio communication device transmits a retransmission request for requesting retransmission of data, which is not correctly received by the reception unit, according to the control of the control unit,
   wherein the control unit performs a control of a content according to the estimated distance, and
   wherein the control unit controls the number of the retransmission requests to be transmitted by the transmission unit according to the estimated distance.

7. The radio communication device according to claim 6, wherein the control unit increases the number of the retransmission requests when the estimated distance is a longer distance.

8. A radio communication system comprising:
   a first radio communication device comprising:
      a control unit that controls to prepare for data loss during radio communication of transmission data with a second radio communication device; and
      a transmission unit that transmits the transmission data by radio to the second radio communication device according to the control of the control unit,
   wherein one of the first radio communication device and the second radio communication device comprises:
      a reception unit configured to receive a radio signal from the second ratio communication device;
      a measurement unit configured to measure a field intensity and an associated noise component from the received radio signal;
      a judgment unit configured to judge whether the noise component satisfies a predetermined condition; and
      an estimation unit configured to estimate a distance between the first radio communication device and the second radio communication device based on the field intensity whose corresponding noise component satisfies the predetermined condition, wherein the first radio communication device is configured to receive one or more requests for retransmission of the transmission data from the second radio communication device, wherein the number of the one or more requests for retransmission depends on the estimated distance, and wherein the control unit performs a control of a content according to the estimated distance.

9. The radio communication system according to claim 8, wherein the first radio communication device further comprises a data processing unit configured to add error correction data to the transmission data, wherein the amount of the added error correction data varies depending on the estimated distance.

10. The radio communication system according to claim 8, wherein the judgment unit judges that the noise component of the radio signal satisfies the predetermined condition when the noise component is greater than a lower limit set value and lower than an upper limit set value.

11. The radio communication system according to claim 8, wherein the estimation unit:
- calculates an average value of a plurality of field intensities of the radio signals which are judged to satisfy the predetermined condition by the judgment unit,
- judges whether the average value is included in any one of classified average value ranges, and
- estimates that the distance between the first and second radio communication devices is a distance corresponding to the average value range to which the average value is included.

12. A radio communication method comprising:
- receiving a radio signal from a transmission source device;
- measuring a field intensity and an associated noise component of the received radio signal;
- judging whether the noise component associated with the field intensity satisfies a certain requirement;
- estimating a distance from the transmission source device based on the field intensity whose corresponding noise component is judged to satisfy the certain requirement;
- controlling to prepare for data loss during transmission of transmission data to the transmission source device by using a content according to the estimated distance;
- transmitting the transmission data by radio to the transmission source device according to the control; and
- receiving one or more requests for retransmission of the transmission data from the transmission source device, wherein the number of the one or more requests for retransmission depends on the estimated distance.

13. The radio communication method according to claim 12, further comprising adding error correction data to the transmission data, the amount of added error correction data being dependent upon the estimated distance.

14. The radio communication method according to claim 12, wherein judging whether the noise component associated with the field intensity satisfies a certain requirement comprises judging that the noise component satisfies the certain requirement when the noise component is greater than a lower limit set value and lower than an upper limit set value.

15. The radio communication method according to claim 12, wherein estimating the distance comprises:
- calculating an average value of a plurality of field intensities whose corresponding noise components are judged to satisfy the certain requirement,
- judging whether the average value is included in any one of classified average value ranges, and
- estimating that the distance from the transmission source device is a distance corresponding to the average value range to which the average value is included.

16. A non-transitory, computer-readable medium for use on a computer for a radio communication device, the computer-readable medium including computer-executable instructions for performing a method for controlling to prepare for data loss during radio communication of transmission data using a content, the method comprising:
- receiving a radio signal from a transmission source device;
- measuring a field intensity and an associated noise component of the received radio signal;
- judging whether the noise component associated with the field intensity satisfies a certain requirement;
- estimating a distance from the transmission source device based on the field intensity whose corresponding noise component is judged to satisfy the certain requirement;
- controlling to prepare for data loss during transmission of transmission data to the transmission source device by using a content according to the estimated distance;
- transmitting the transmission data by radio to the transmission source device according to the control; and
- receiving one or more requests for retransmission of the transmission data from the transmission source device, wherein the number of the one or more requests for retransmission depends on the estimated distance.

17. The non-transitory, computer-readable medium of claim 16, wherein the method further comprises adding error correction data to the transmission data, the amount of added error correction data being dependent upon the estimated distance.

18. The non-transitory, computer-readable medium of claim 16, wherein estimating the distance comprises:
- calculating an average value of a plurality of field intensities whose corresponding noise components are judged to satisfy the certain requirement,
- judging whether the average value is included in any one of classified average value ranges, and
- estimating that the distance from the transmission source device is a distance corresponding to the average value range to which the average value is included.

* * * * *

UNITED STATES PATENT AND TRADEMARK OFFICE
CERTIFICATE OF CORRECTION

PATENT NO.       : 8,479,059 B2
APPLICATION NO.  : 12/741536
DATED            : July 2, 2013
INVENTOR(S)      : Michinari Kohno et al.

It is certified that error appears in the above-identified patent and that said Letters Patent is hereby corrected as shown below:

In the Claims:

Claim 1, col. 29, line 39, "the other ratio" should read -- the other radio --.

Signed and Sealed this
Fifteenth Day of October, 2013

Teresa Stanek Rea
*Deputy Director of the United States Patent and Trademark Office*